(12) United States Patent
Oesterreicher et al.

(10) Patent No.: US 11,315,340 B2
(45) Date of Patent: *Apr. 26, 2022

(54) METHODS AND SYSTEMS FOR DETECTING AND ANALYZING A REGION OF INTEREST FROM MULTIPLE POINTS OF VIEW

(71) Applicant: Streaming Global, Inc., Duluth, GA (US)

(72) Inventors: Richard Oesterreicher, Duluth, GA (US); Jonathan Hessing, Duluth, GA (US); Zunair Ukani, Duluth, GA (US); Austin Schmidt, Duluth, GA (US)

(73) Assignee: Streaming Global, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/809,687

(22) Filed: Mar. 5, 2020

(65) Prior Publication Data
US 2020/0202158 A1    Jun. 25, 2020

Related U.S. Application Data

(63) Continuation of application No. 15/668,510, filed on Aug. 3, 2017, now Pat. No. 10,586,124.

(51) Int. Cl.
*G06K 9/00* (2022.01)
*G06V 10/20* (2022.01)
(Continued)

(52) U.S. Cl.
CPC ............ *G06V 10/255* (2022.01); *G06T 7/292* (2017.01); *G06T 7/521* (2017.01); *G06T 7/55* (2017.01);
(Continued)

(58) Field of Classification Search
CPC .. G06K 9/3241; G06K 9/481; G06K 9/00718; G06T 7/60; G06T 7/73;
(Continued)

(56) References Cited

U.S. PATENT DOCUMENTS 9,183,560 B2   11/2015   Abelow
9,509,968 B2   11/2016   Zimmermann et al.
(Continued)

*Primary Examiner* — Amara Abdi
(74) *Attorney, Agent, or Firm* — Bekiares Eliezer LLP

(57) ABSTRACT

Disclosed are devices, systems, methods, techniques, and computer program products for estimating a Region Of Interest (ROI) corresponding to a plurality of content streams. A method may include receiving a plurality of sensor data associated with a plurality of mobile devices. The plurality of sensor data corresponds to a plurality of content streams captured by the plurality of mobile devices. Further, each of the plurality of mobile devices may include at least one recorder configured to capture a corresponding content stream. Further, a sensor data associated with a mobile device may include a location data and an orientation data of the mobile device during capturing of a content stream. The method may further include, analyzing, by the system, the plurality of sensor data and determining, by the system, a ROI based on at least the plurality of sensor data, thereby generating an estimation of the ROI.

20 Claims, 16 Drawing Sheets

(51) Int. Cl.
*G06T 7/73* (2017.01)
*G06T 7/62* (2017.01)
*G06T 7/292* (2017.01)
*G06T 7/55* (2017.01)
*G06T 7/521* (2017.01)
*G06T 7/60* (2017.01)
*G06V 10/46* (2022.01)
*G06V 20/40* (2022.01)

(52) U.S. Cl.
CPC .................. *G06T 7/60* (2013.01); *G06T 7/62* (2017.01); *G06T 7/73* (2017.01); *G06V 10/469* (2022.01); *G06V 20/41* (2022.01); *G06T 2207/10016* (2013.01); *G06T 2207/30241* (2013.01); *G06T 2207/30244* (2013.01)

(58) Field of Classification Search
CPC .. G06T 7/62; G06T 7/292; G06T 7/55; G06T 7/521; G06T 2207/10016; G06T 2207/30244; G06T 2207/30241
See application file for complete search history.

(56) References Cited

U.S. PATENT DOCUMENTS

| | | | |
|---|---|---|---|
| 2002/0047895 A1* | 4/2002 | Bernardo | G01C 11/02 348/48 |
| 2012/0200707 A1* | 8/2012 | Stein | G01B 11/026 348/148 |
| 2013/0051623 A1* | 2/2013 | Ofek | G06K 9/00664 382/103 |
| 2014/0292746 A1* | 10/2014 | Acharya | G06K 9/00201 345/419 |
| 2016/0035224 A1* | 2/2016 | Yang | G08G 5/0078 701/23 |
| 2016/0071325 A1* | 3/2016 | Callaghan | H04W 4/02 345/633 |
| 2017/0111413 A1* | 4/2017 | Nowak | H04N 5/77 |
| 2019/0042868 A1 | 2/2019 | Oesterreicher et al. | |

* cited by examiner

METHODS AND SYSTEMS FOR DETECTING AND ANALYZING A REGION OF INTEREST FROM MULTIPLE POINTS OF VIEW

RELATED APPLICATIONS

This application is a continuation of U.S. application Ser. No. 15/668,510 filed Aug. 3, 2017, which issues on Mar. 10, 2020 as U.S. Pat. No. 10,586,124, is hereby incorporated herein by reference in its entirety.

Related U.S. patent application Ser. No. 15/668,540, filed on Aug. 3, 2017, which issued on Feb. 25, 2020 as U.S. Pat. No. 10,574,715, entitled "Method And System For Aggregating Content Streams Based On Sensor Data," assigned to the assignee of the present application, is hereby incorporated by reference.

It is intended that the above-referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to digital data processing. More specifically, the disclosure relates to a method and system for estimating a Region Of Interest (ROI) corresponding to a plurality of content streams.

BACKGROUND

As users increasingly turn to the internet for all their information needs, there is a constant pressure on information providers to expand their databases with newer data. One example of such data relates to events. Accordingly, there are several information providers who maintain event databases that inform users about a time and a place where an event (e.g., a sporting event, a music concert, a conference, etc.) is scheduled to occur. Additionally, such event databases may also include information about currently ongoing events and/or completed events. Further, in case of events that are completed, a recording (audio, video, multimedia etc.) of the event are typically available to users.

However, conventionally, such event databases are constructed and maintained largely based on manual efforts. For example, content reviewers scour various communication channels (e.g., newspapers, magazines, direct communication from event organizers, radio, television, advertisements etc.) in order to identify events and accordingly update an event database.

Firstly, the manual process of discovering events and updating event databases is cumbersome and time consuming. Typically, individuals delegated with the task of searching and identifying events and associated event information (type of event, time, place, etc.) are burdened. Further, while some event databases allow general users to provide such event information (i.e., crowdsourcing of event information), reviewing such information for correctness is still a difficult and time consuming process.

Secondly, due to the limited number of communication channels that are searched by content reviewers, a large number of interesting events that are not advertised on such communication channels are missed. For example, there may be several local events which may not garner an advertising campaign. However, users situated in the vicinity of such events may nonetheless be highly interested in these local events.

Thirdly, some events may occur on an ad-hoc basis and/or in an unorganized manner, which thus makes it difficult to collect and provision corresponding event information to users in a timely fashion.

Further, while currently there are techniques of aggregating content streams based on location, topic, etc., such aggregation of content streams may not necessarily correspond to an event. For example, at a place with high tourist foot-fall, a large number of users may be capturing and streaming video of different regions and/or subjects which may not correspond to a singular event.

Fourthly, while an event may be spread across a large spatial region, there may be one or more smaller regions of interest at different times during the event's progression. For example, at an event involving a large stage, interesting action may take place on different regions of the stage at different times. However, existing methods do not provide an automatic and reliable way of determining such regions of interest for a user's benefit.

Lastly, while users are currently offered the ability to consume a video recording of an event from different viewpoints, there is no intuitive user interface that enables users to effectively navigate across multiple viewpoints to experience the event from different perspectives.

Accordingly, there is a need for methods and systems for automatically discovering events and identifying regions of interest in such events in a manner that overcomes one or more of the above-mentioned drawbacks.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1A:
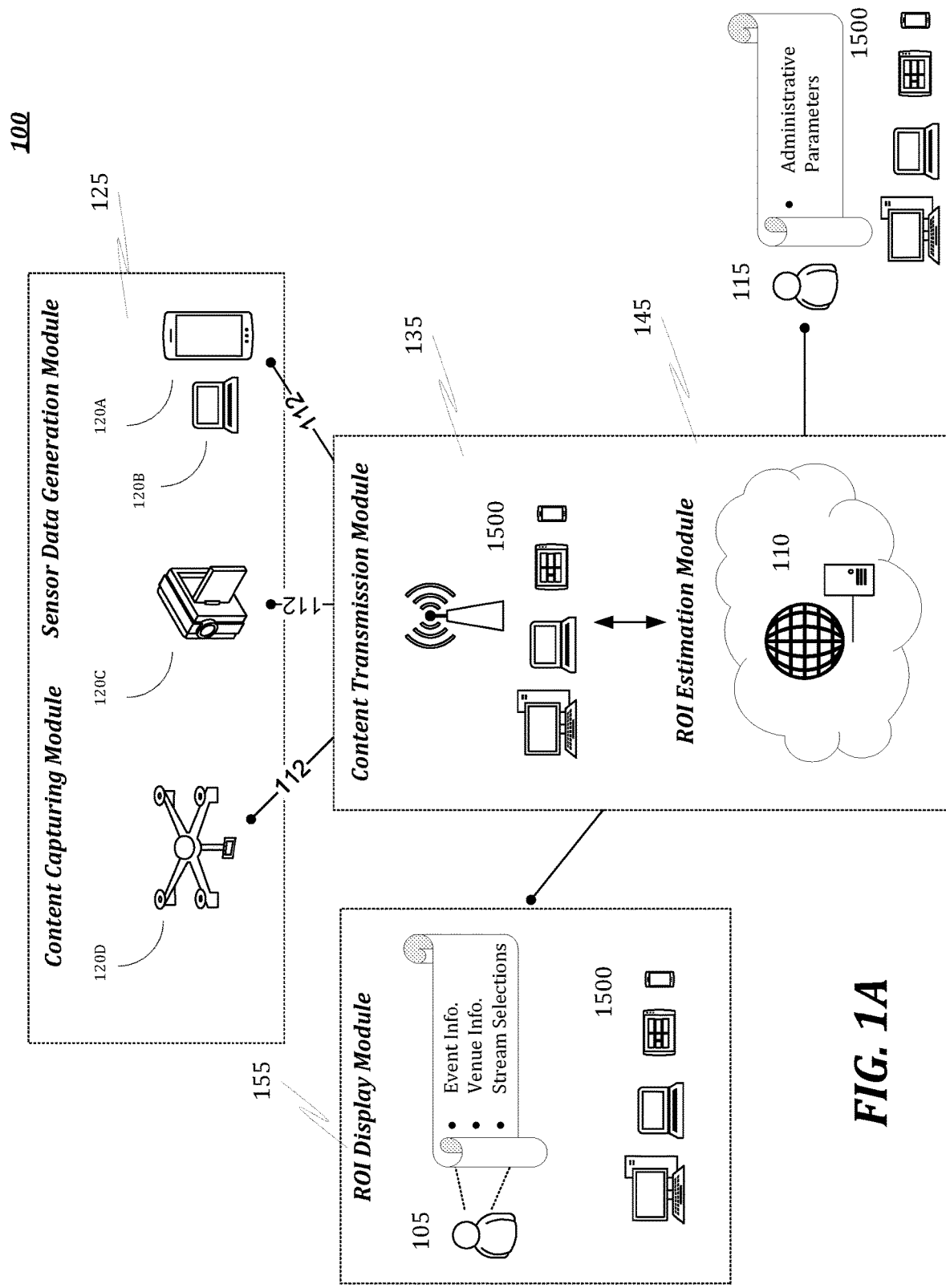
FIG. 1A illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of content streams such as live audio/video streams, embodiments of the present disclosure are not limited to use only in this context. For instance, the methods and systems disclosed herein may be used to aggregate any digital content based on corresponding metadata (for example, but not limited to, sensor data) associated with the digital content.

I. Platform Overview

Consistent with embodiments of the present disclosure, methods, computer-readable media, and systems for Region of Interest (ROI) estimation and representation (also referred to herein as "platform" or ROI estimation platform) may be provided. Estimation and/or representation of a ROI may at least be based on sensor data including location data and orientation data corresponding to recording devices. This overview is provided to introduce a selection of concepts in a simplified form that are further described below. This overview is not intended to identify key features or essential features of the claimed subject matter. Nor is this overview intended to be used to limit the claimed subject matter's scope. The platform may be used by individuals or companies to estimate ROI based on sensor data, such as, location data and orientation data corresponding to recording devices. Thus, according to exemplary aspects, the present disclosure provides methods, systems, and/or techniques for discovering an event and a region of interest associated with the event.

In another exemplary aspect, the present disclosure describes techniques of estimating a ROI using data provided by location and orientation sensors built into a smart mobile device to determine a live stream point of view (POV). The POVs from multiple smart mobile devices at the same relative location or venue can be analyzed to determine the Region of Interest (ROI) for an event at that location. The ROI can then be visualized graphically on a viewer's smart mobile device or television to aid in understanding an event's location with no prior knowledge of the size and shape of the venue.

In another exemplary aspect, the present disclosure provides a method to collect and analyze a plurality of data streams to compute an approximate size and shape of the ROI at a venue with no previous knowledge of the venue. In some aspects, two or more people may be present at the venue and that two or more of the people are pointing the camera on their smart mobile devices at something within the ROI. In further aspects, the accuracy of the computed area and/or volume may be relative to the number of people pointing their devices at the ROI. The method can be used to calculate two-dimensional or three-dimensional volumes.

In various aspects, each person's mobile smart device, such as a modern smart phone, tablet, or wearable includes sensors to measure global position, compass heading, and acceleration of movement in three dimensions. The data from each of these smart mobile devices, in addition to the make and model of the device, can be streamed over a collection of wireless and wired networks to a computer server and data storage. The server can then process the data from each device. The global positioning system coordinates can be converted to an origin point in a mapping coordinate system. The compass heading angle can be converted to a vector, or specifically a direction from the origin point. The combination of the origin point and the vector can mathematically represent the position and direction that the person is pointing their smart mobile device, relative to other people's devices at the venue.

In further aspects, an array of previously collected data about the make and model of smart mobile devices can be used to provide lens characteristics for the specific smart mobile device. The lens characteristics can be used to determine the ever-expanding field of view (FOV) for the specific smart mobile device's camera. In yet further aspects, the FOV can be represented geometrically as an expanding square frustum.

In further aspects, the origin points of all smart mobile devices collecting data at the venue can be placed in the same coordinate system so that their position is accurate relative to the position of the actual people pointing their devices in the real venue. In some aspects, a two-dimensional line segment representing the length or magnitude of the directional vectors for each device can be extended from their origin point to a pre-estimated maximum length, less than infinity, to cover the size of a very large venue, such as a stadium or park.

Intersections of these vectors can represent shared areas being pointed at by people. The specific camera frustum can be overlaid onto each smart mobile device's origin point with the directional vector as the center expanding direction of the frustum. In still further aspects, the outer edges of the intersections of the expanded view areas can be connected to form a polygonal representation of the shared ROI.

In some aspects, such as where devices appear to be pointing from one side of a 180° line, such as with a smaller concert venue or amphitheater, the closest interior origin point can be used to estimate the beginning depth of the ROI. In further aspects, the type of event, such as a concert, could be used to estimate the maximum depth of the ROI.

In other aspects, such as where devices appear to be pointing from all sides, such as a stadium or large sporting event, a center point or centroid can be computed from all origin points. In further aspects, the distance from the centroid can be computed for every origin point. In still further aspects, a number of directions can be sampled, such from greater than one, for example, four or sixteen. In yet further aspects, the closest origin point from the centroid in every sampled direction can be connected to estimate the containing shape of the ROI.

In further aspects, the region of interest is at least based on analysis of content streams captured by multiple recording devices (e.g., smartphone cameras, portable cameras, wearable cameras, etc.) from different viewpoints. In still further aspects, data related to positions and orientations of multiple recording devices can be analyzed to determine a Region Of Interest (ROI) towards which the multiple recording devices are pointed. In yet further aspects, determination of the ROI can further comprise discovery of an event captured by users of the multiple recording devices. In even further aspects, optical characteristics (e.g., field of view) of the multiple recording devices can be utilized to determine attributes of the ROI such as, size, shape, volume, etc. As a result, a graphical representation of the ROI may be provided to users depicting a spatial form of the ROI with relative positions of the multiple recording devices. Such a graphical representation may allow users to intuitively visualize the ROI and other available viewpoints of the ROI. Thus, in conjunction with access to content streams captured by the multiple recording devices, users may be provided with an intuitive and powerful user interface for navigating across multiple viewpoints and consuming the content streams that include the ROI.

In further aspects, the multiple recording devices may be configured to capture and transmit sensor data representing position and orientation of respective recording devices. Accordingly, each recording device may include a position sensor (e.g., GPS sensor) and an orientation sensor (e.g., magnetic compass). In still further aspects, the sensor data may include a time indicator corresponding to sensing of the position and orientation of respective recording devices. Such sensor data may, in some aspects, be transmitted along with content (e.g., video, audio etc.) captured by respective recording devices.

According to various aspects, the sensor data may be processed by one or more computing devices or recording devices in connection with one or more stages of the disclosed methods and systems. For example, the sensor data may be embedded as metadata in a content stream captured and transmitted by a recording device, such as a smartphone. In further aspects, the smartphone may be provided with an app configured for capturing and transmitting the sensor data to a computing device, such as central computing device, for example, a server. In still further aspects, the app may be configured for embedding the sensor data during capturing of content. In yet further aspects, the recording devices may be configured to only transmit sensor data along with corresponding time indicators to indicate a respective time (e.g., date and time of day) when the sensor data was captured.

In further aspects, transmitted sensor data in multiple content streams may be received by a central computing device, such as a server. In some aspects, the server may process or sort the multiple content streams according to one or more attributes such as, location, time, orientation, etc. By way of non-limiting example, initially, the server may process or sort the multiple content streams based on temporal and spatial proximity. To this end, content streams which were captured within a short time window (e.g., few hours, minutes, etc.) and at a common place (e.g., a sports stadium, amphitheater, concert venue, etc.) may be aggregated. In other aspects, transmitted data from can also be received and processed by another smartphone (e.g., another user of the platform). For example, a user of the disclosed platform and systems may receive and utilize data transmitted from another user's smartphone (e.g., a different user viewing a common event) to determine and produce an ROI. In further aspects, the shared data can be unprocessed sensor data, or data processed by a user to determine a ROI, or combinations thereof.

Further, sensor data (i.e., position and orientation) in the multiple content streams may be analyzed in order to determine one or more ROIs. Accordingly, each recording device may be represented as an origin point in a coordinate space constructed by the server. Accordingly, the positions (i.e., geographical locations) of the multiple recording devices may be mapped in the coordinate space while preserving a spatial relationship among the positions. For example, a first recording device, a second recording device and a third recording device may be away from each other by 100 m. In other words, the three recording devices may be located at vertices of an equilateral triangle. Accordingly, three origin points may be created in the coordinate space with the same spatial relationship. In other words, the three origin points may be equidistant from each other.

Further, each origin point may be associated with a vector (2D or 3D vector) representing an orientation of a respective recording device. In further aspects, a first recording device may be represented by a first origin point and a first vector in the coordinate space, wherein spatial coordinates of the first recording device is based on position of the first recording device, while a direction of the first vector is based on orientation of the first recording device. In still further aspects, each of the vectors may be extended indefinitely or until they reach a surface of a bounding box of the coordinate space. In yet further aspects, the bounding box may be of arbitrary form and significantly larger than the biggest ROI determinable.

Subsequent to extending the vectors corresponding to the multiple origin points, intersections among the vectors may be determined. For example, given a first origin point and a first vector corresponding to the first origin point, a first line in the coordinate space may be computed. Similarly, a second line may be computed based on a second origin point and a second vector. Further, using coordinate geometry, it may be computationally determined whether the first line intersects the second line within the coordinate space. Further, an intersection point corresponding to the first line and the second line may also be computationally determined. Accordingly, multiple such intersection points may be determined corresponding to a plurality of pairs of lines. Further, in some aspects, lines may overlap each other resulting in a plurality of intersection points for a given pair of lines. Furthermore, the number of such intersection points may be based on a sampling distance in the coordinate space.

In further aspects, a spatial distribution of the intersection points may be computationally analyzed. Accordingly, one or more spatial characteristics associated with the multiple intersection points may be computed. For example, a density of intersection points at various points within the coordinate space may be computed. Accordingly, spatial regions with density exceeding a threshold value may be identified as being coincident with the ROI. In other words, a spatial concentration of intersection points can, in various aspects, indicate presence of the ROI. Additionally, a spatial distribution of the intersection points may indicate attributes of the ROI, such as, shape, size, area, volume, etc. Accordingly, in some aspects, by computing a boundary associated with the spatial concentration of intersection points, a shape of the ROI may be determined. Further, attributes of the ROI such as area and volume may then be computationally determined based on the boundary.

Further, by considering one or more optical characteristics of the multiple recording devices, estimation of the ROI may be performed with higher accuracy. For example, field of view (FOV) corresponding to the multiple recording devices may be taken into account in determining the ROI. Accordingly, the multiple recording devices may be configured to transmit respective FOV values to the server. Alternatively, the multiple recording devices may be configured to transmit device information (i.e., model number, product code etc.) based on which the server may determine corresponding FOV values by performing a database search.

Subsequently, for each origin point and corresponding vector, a viewing frustum (2D or 3D) may be constructed in the coordinate space at least based on a FOV value associated with the origin point. Further, an apex of a viewing frustum associated with a recording device may be coincident with an origin point associated with the recording device. Furthermore, a view direction of the viewing frustum may be aligned with the vector associated with the origin point. Subsequently, a plurality of intersections of multiple viewing frustums may be determined. Such determination may be performed computationally using coordinate geometry. Further, by computationally analyzing characteristics of the plurality of intersections of viewing frustums, the ROI may be estimated.

Subsequent to determining the ROI, a visualization of the ROI may be generated by the system. The visualization of the ROI may be a geometrical FIG. 2D or 3D) depicting the shape and orientation of the ROI. For example, a performance stage which may be of circular form may be represented as a circle in the visualization. Additionally, the visualization may include visual representation of the multiple recording devices according to respective positions in relation to the ROI. In other words, the visualization of the ROI may also depict where the multiple recording devices are spatially situated in relation to the ROI. As a result, the visualization enables users to view a spatial form of the ROI and also the multiple viewpoints that are available. Accordingly, a user may select a representation of a visualization in the particular recording device in order to express an interest in a corresponding viewpoint. In some aspects, the visualization may be configured to receive user inputs associated with different regions of the visualization. For example, the visualization displayed on a touch-screen may be configured to receive touch inputs on points corresponding to the multiple recording devices. Consequently, the content stream captured by the particular recording device may be retrieved and displayed to the user. As a result, the visualization may function as a spatial user interface that may enable users to intuitively navigate across multiple viewpoints and consume corresponding multiple content streams.

According to further exemplary aspects, the present disclosure provides at least two methods related to live streaming events. A first method includes collecting, streaming, and collectively analyzing sensor data from the smart mobile devices of live streamers at the same event to determine and visualize the relative position and orientation of the streamers. A second method includes using that data and analysis to estimate the size and shape of the Region of Interest being covered by the collection of live streamers.

As described herein, determining an estimated ROI has several benefits. In further aspects, a use related to live streaming events enables a user interface element to visualize multiple available viewpoints around the most likely Region of Interest. In still further aspects, this aids the user in understanding the likely size and shape of the volume that they are navigating when exploring multiple points of view around an event.

I. Embodiments of the present disclosure provide a software and hardware platform comprised of a distributed set of modules, including, but not limited to:
  A. Sensor Data Generation Module; and
  B. ROI Estimation Module.

In some embodiments, the present disclosure may provide an additional set of modules for further facilitating the software and hardware platform. The additional set of modules may comprise, but not be limited to:
  A. ROI Display Module; and
  B. Content Transmission/Streaming Module.

Figure 1B:
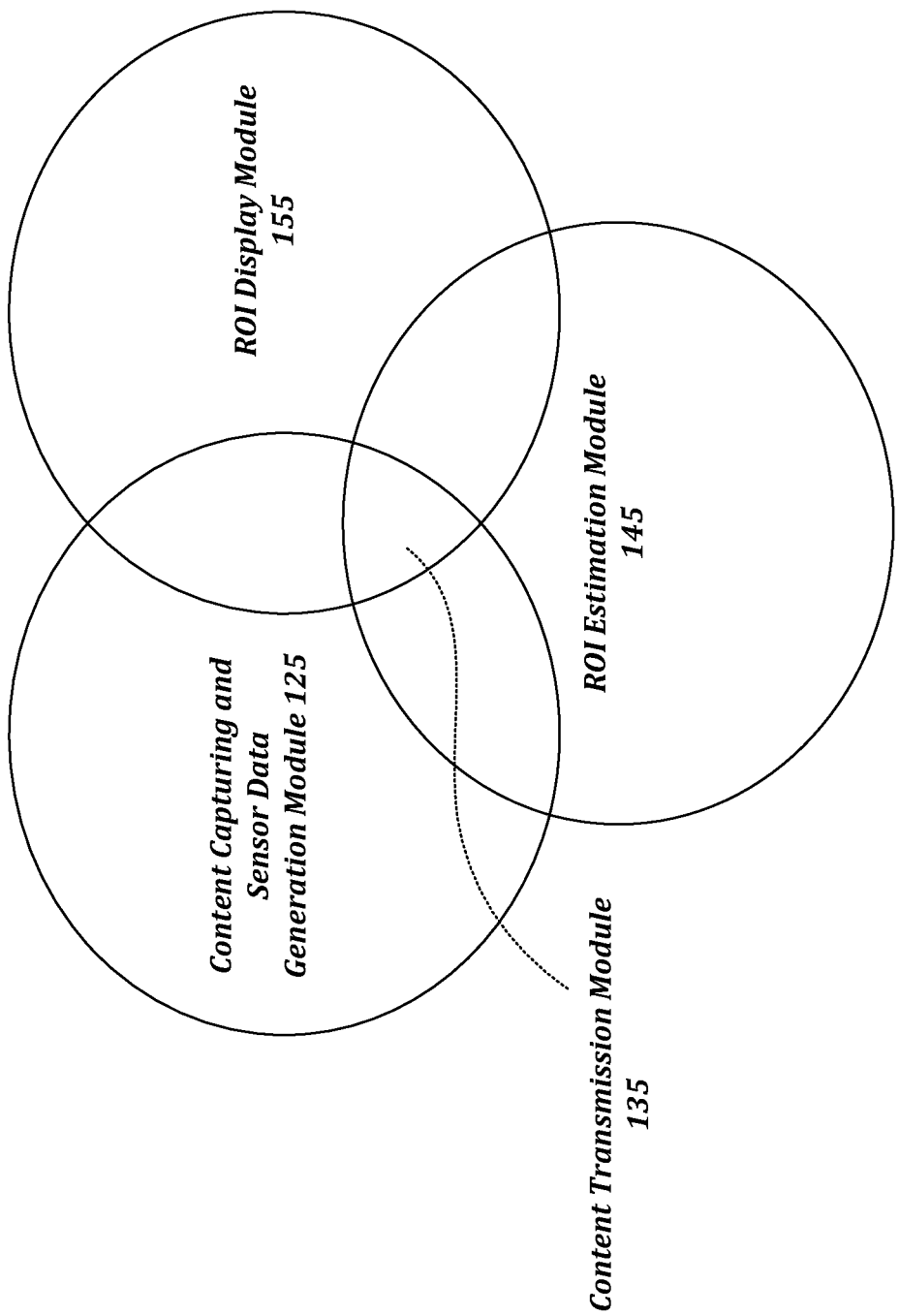
FIG. 1B illustrates a schematic diagram of system modules for ROI estimation consistent with the present disclosure.

FIGS. 1A and 1B illustrate non-limiting examples of operating environments for the aforementioned modules. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the claim language can be considered independently without the context of the other stages. Each stage may contain language defined in other portions of this specifications. Each stage disclosed for one module may be mixed with the operational stages of another module. Each stage can be claimed on its own and/or interchangeably with other stages of other modules. The following claims will detail the operation of each module, and inter-operation between modules.

II. Embodiments of the present disclosure provide a software and hardware platform comprised of a distributed set of computing elements, including, but not limited to:
  A Computing Device
  (FIG. 15—Computing Device 1500)
  Wherein the platform is operative to control a computing device in furtherance of the operation of the content generation module,
  The computing device comprising, but not limited to at least one of the following:
    A processing unit,
    A memory storage,
    Wherein the computing device may be embodied as a mobile computing device,
    wherein the mobile computing device comprises, but is not limited to,
    A tablet,
    A smartphone,
    A drone,
    A wearable (such as watch or smart glasses), and,
    A remotely operable recording device;
    Wherein the computing device may comprise sensing devices,
    wherein the sensing device may comprise, but is not limited to,
    A camera, and
    A microphone;
    A location sensor;
    An orientation sensor;
    A motion sensor;
    A speed sensor; and
    Wherein the computing device may be in communication with the sensing devices, wherein the sensing devices provide telemetry data associated with the computing device.
  Sub-Modules Associated with the Computing Device
  (FIG. 15—Program Modules 1506)
  Wherein the platform is operative to control at least one of the following sub-modules of a computing device:
    A user interface module,
    A sensor data generation module,
    i. A location module,
    ii. An orientation module,
    A content capturing module,
    A timing module, and
    A communications module.
    1. The User Interface Module
    a. Enables user-control of the Computing Device
    b. Enables user-control of the Sub-Modules of the Computing Device
      i. The user interface module
      ii. The sensor data generation module
      iii. The content capturing module
      iv. The timing module
      v. The location module
      vi. The communications module
    b. Enables user-control of the Platform Modules:
      i. The sensor data generation module
      ii. The content capturing module
      iii. The content transmission module iv. The ROI estimation module
v. The ROI display module
2. The Sensor Data Generation Module
a. Enables operative control of sensing devices comprised in the recording devices
i. Sensing Devices
1. Location sensor
2. Orientation sensor
3. Motion sensor
4. Speed sensor
b. Enables Digital Signal Processing on sensor data:
i. Enables filtering, but not limited to, location, time, orientation, speed, direction of motion
ii. Enables image processing techniques such as, but not limited to, motion stabilization, low pass filtering, noise removal
3. The Content Capturing Module
a. Enables operative control of content recordation hardware
i. Sensing Device
1. Optical Sensors
2. Audio Sensors
3. Telemetry Sensors
b. Enables capturing based on data:
i. Recordation of content received from the communications module
ii. Recordation of content displayed on the computing device (e.g., screen capture)
c. Enables Digital Signal Processing on captured content:
i. Enables Content Stitching based on, but not limited to, spatial parameters and temporal parameters
ii. Enables image processing techniques such as, but not limited to, image stabilization.
4. The Timing Module
a. Operative control of a clock associated with the computing device
b. In operative communication with a central clock
c. Time stamps sensor data captured by the sensor data generation module
d. Used for correlating/syncing sensor data captured by multiple recording devices
e. Time stamps content captured by the content capturing module
f. Used for syncing various content streams
5. The Location Module
a. Enables the reading and communicating of location data associated with a sensing device;
b. The location data may be obtained by way of, for example, but not limited to:
i. GPS/IP Address/Triangulation
ii. LAN/WAN
6. The Orientation Module
a. Enables the capture of orientation data from multiple sensing devices associated with the content capture module
7. The Communications Module
a. Enables the networking of the multiple sensor data generation modules associated with multiple networked devices
b. Configured to join 'groups' of devices generating sensor data under a similar context (e.g., location/theme/etc.)
c. Remote control of the sensor data generation modules
d. Enables the networking of the multiple content capture modules associated with multiple networked devices
e. In operative communication with other communications modules of computing devices capturing content
f. Configured to communicate with nearby devices also running on the platform
g. Configured to join 'groups' of devices capturing content under a similar 'location/theme/etc.'
h. Remote control of the capturing modules
i. Remote control of the camera
j. Remote control of the microphone
k. Via Wireless Media
l. Via Wired Media Various hardware components may be used at the various stages of operations follow the method and computer-readable medium. For example, although the methods have been described to be performed by a computing device, it should be understood that, in some embodiments, different operations may be performed by different networked elements in operative communication with the computing device. For example, server 110 and/or computing device 1500 may be employed in the performance of some or all of the stages disclosed with regard to the methods below.

III. Embodiments of the present disclosure provide a hardware and software platform operative by a set of methods and computer-readable media comprising instructions configured to operate the aforementioned modules and computing elements in accordance with the methods.

The methods and computer-readable media may comprise a set of instructions which when executed are configured to enable a method for inter-operating at least one of the following modules:
A. Sensor Data Generation Module;
B. Sensor Data Reception Module;
C. ROI Estimation Module; and
D. ROI Display Module The aforementioned modules may be inter-operated to perform a method comprising the following stages:
1. Receiving, by a system having at least one processor, a plurality of sensor data associated with a plurality of mobile devices;
a. wherein the plurality of sensor data corresponds to a plurality of content streams captured by the plurality of mobile devices;
i. wherein the sensor data comprises information indicative of a plurality of viewpoints respective to the ROI, the plurality of viewpoints respective to the ROI is respectively associated with the plurality of content streams;
ii. wherein sensor data comprises imagery information (e.g., data, metadata, and/or signaling, etc.);
b. wherein each of the plurality of mobile devices comprises at least one recorder configured to capture a corresponding content stream;
c. wherein a sensor data associated with a mobile device comprises a location data and an orientation data of the mobile device during capturing of a content stream;
i. Receiving, by the system, a plurality of optical characteristics corresponding to the plurality of mobile devices; and wherein determining the ROI is based at least on the plurality of optical characteristics;
1. wherein an optical characteristic of a mobile device comprises a Field of View (FOV) of a lens comprised in the mobile device;
2. receiving a plurality of device identifiers from the plurality of mobile devices, wherein the plurality of optical characteristics is identified based on at least the plurality of device identifiers;
3. wherein the device identifier comprises at least one of a device serial number, device identification information, device manufacturer, device type, device model, device component information and a version of software associated with the device;
2. Analyzing, by the system, the plurality of sensor data;
a. wherein analyzing the plurality of sensor data comprises:
i. determining a plurality of origin points based at least on a plurality of location data corresponding to the plurality of mobile devices; and
ii. determining a plurality of vectors associated with the plurality of origin points based at least on a plurality of orientation data corresponding to the plurality of mobile devices, a vector associated with an origin point originating at the origin point;
3. Determining, by the system, a ROI based on at least the plurality of sensor data, thereby generating an estimation of the ROI;
a. wherein determining the ROI is based at least on the plurality of origin points and the plurality of vectors;
b. wherein the plurality of origin points is configured to be used as coordinates in a mapping coordinate system;
c. further comprising determining a plurality of vector intersections of the plurality of vectors;
d. wherein determining the ROI is based at least on the plurality of vector intersections;
e. wherein an attribute associated with the ROI comprises a shape, a size, a spatial dimension, a position, an orientation, and a volume;
f. wherein determining the ROI comprises determining at least one spatial dimension of the ROI;
g. wherein the at least one depth is estimated based at least on the origin point closest to the ROI;
h. further comprising determining a center point of the ROI based at least on the plurality of origin points;
i. wherein the plurality of distances is computed based on the center point, wherein a distance of the plurality of distances corresponding to an origin point is between the center point and the origin point;
j. further comprising sampling a plurality of directions associated with the ROI;
k. wherein a shape of the ROI is estimated based on closest origin point from the center point in each direction of the plurality of directions;
l. wherein the at least one object is characterized by at least one of a size, a shape, a volume, a position, an orientation and a spatial dimension;
m. wherein determining the ROI comprises calculating at least one of a two-dimensional volume and a three-dimensional volume;

Embodiment 1 n. Receiving a plurality of Field of Views (FOVs) associated with the plurality of mobile devices, a Field of View (FOV) associated with a mobile device being associated with a lens comprised in the mobile device;
o. Determining a plurality of origin points based at least on a plurality of location data corresponding to the plurality of mobile devices, the plurality of origin points configured as coordinates in a mapping coordinate system;
p Determining a plurality of vectors associated with the plurality of origin points based at least on a plurality of orientation data corresponding to the plurality of mobile devices, a vector associated with an origin point originating at the origin point;
i. wherein determining a plurality of origin points comprises converting a plurality of location data corresponding to the plurality of mobile devices into a plurality of origin points in a mapping coordinate system; and wherein determining a plurality of vectors comprises converting a plurality of orientation data corresponding to the plurality of mobile devices into a plurality of vectors associated with the plurality of origin points, wherein a vector associated with an origin point originates at the origin point;
q. Generating a plurality of viewing frustums based at least on the plurality of FOVs, wherein an apex of a viewing frustum associated with a mobile device is coincident with the origin point associated with the mobile device, wherein a view direction of the viewing frustum is aligned with the vector associated with the mobile device; and
r. Determining a plurality of intersections of the plurality of viewing frustums, wherein determining the ROI is based at least on the plurality of intersections of the plurality of viewing frustums;

Embodiment 2 s. Receiving the plurality of content streams from the mobile devices;
t. Analyzing the plurality of content streams;
u. Determining at least one object associated with the ROI; and
v. Determining at least one spatial dimension associated with the at least one object; wherein determining the ROI is based at least on the at least one spatial dimension;

Embodiment 3 w. Receiving the plurality of content streams from the mobile devices;
x. Analyzing the plurality of content streams;
y. Determining at least one object associated with the ROI based at least on the plurality of content streams;
z. Determining at least one spatial dimension associated with the at least one object based at least on a predetermined association between a plurality of objects and a plurality of spatial dimensions;
aa. Determining a plurality of distances corresponding to the plurality of mobile devices and the ROI, wherein a distance between a mobile device and the ROI is estimated based on a spatial dimension of the at least one object determined in a content stream captured by the mobile device; wherein determining the ROI is based at least on the plurality of distances;
i. wherein determining the plurality of distances comprises determining a plurality of distances corresponding to the plurality of mobile devices;
ii. wherein a distance between a mobile device and the ROI is determined based at least on a spatial dimension of the at least one object determined in a content stream captured by the mobile device;
iii. wherein the sensor data further comprises a distance data representing a distance of the mobile device from at least one object comprised in the ROI, wherein the mobile device comprises a ranging sensor configured to determine the distance;
iv. wherein the ranging sensor comprises at least one of a LIDAR sensor and an image sensor;

Embodiment 4 bb. executing a search on a venue database based on the location data;
cc. determining the venue from a venue database based at least on the location data; and
dd. retrieving at least one spatial characteristic of the venue;
ee. wherein determining the ROI is based at least on the at least one spatial characteristic.

Embodiment 5 ff. wherein the plurality of mobile devices comprises a drone configured for flight.
gg. further comprising determining at least one trajectory associated with at least one mobile device based at least on analysis of the plurality of sensor data; wherein determining the ROI is based at least on the at least one trajectory.
4. Generating a visualization of the ROI and the plurality of mobile devices;
a. transmitting the visualization to at least one mobile device of the plurality of mobile devices;
b. receiving a selection associated with the visualization;
c. identifying one or more mobile devices associated with the selection;
d. transmitting one or more content streams captured by the one or more mobile devices;

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. Embodiments of the present disclosure provide a hardware and software platform operative as a distributed system of modules and computing elements.

The system comprising:
A. Sensor Data Generation Module configured for:
a. Generation of sensor data
i. Location data
ii. Orientation data
iii. Motion data
iv. Speed data
B. Sensor Data Reception Module configured for:
a. Receiving, by a system having at least one processor, a plurality of sensor data associated with a plurality of mobile devices;
I. wherein the plurality of sensor data corresponds to a plurality of content streams captured by the plurality of mobile devices;
i. wherein the sensor data comprises information indicative of a plurality of viewpoints respective to the ROI, the plurality of viewpoints respective to the ROI is respectively associated with the plurality of content streams;
ii. wherein sensor data comprises imagery information (e.g., data, metadata, and/or signaling, etc.);
II. wherein each of the plurality of mobile devices comprises at least one recorder configured to capture a corresponding content stream;
III. wherein a sensor data associated with a mobile device comprises a location data and an orientation data of the mobile device during capturing of a content stream;
i. Receiving, by the system, a plurality of optical characteristics corresponding to the plurality of mobile devices; and wherein determining the ROI is based at least on the plurality of optical characteristics;
1. wherein an optical characteristic of a mobile device comprises a Field of View (FOV) of a lens comprised in the mobile device;
2. receiving a plurality of device identifiers from the plurality of mobile devices, wherein the plurality of optical characteristics is identified based on at least the plurality of device identifiers;
3. wherein the device identifier comprises at least one of a device serial number, device identification information, device manufacturer, device type, device model, device component information and a version of software associated with the device;
C. ROI Estimation Module configured for:
a. Determining, by the system, a ROI based on at least the plurality of sensor data, thereby generating an estimation of the ROI;
i. wherein determining the ROI is based at least on the plurality of origin points and the plurality of vectors;
ii. wherein the plurality of origin points is configured to be used as coordinates in a mapping coordinate system;
iii. further comprising determining a plurality of vector intersections of the plurality of vectors;
iv. wherein determining the ROI is based at least on the plurality of vector intersections;
v. wherein an attribute associated with the ROI comprises a shape, a size, a spatial dimension, a position, an orientation, and a volume;
vi. wherein determining the ROI comprises determining at least one spatial dimension of the ROI;
vii. wherein the at least one depth is estimated based at least on the origin point closest to the ROI;
viii. further comprising determining a center point of the ROI based at least on the plurality of origin points;
ix. wherein the plurality of distances is computed based on the center point, wherein a distance of the plurality of distances corresponding to an origin point is between the center point and the origin point;
x. further comprising sampling a plurality of directions associated with the ROI;
xi. wherein a shape of the ROI is estimated based on closest origin point from the center point in each direction of the plurality of directions;
xii. wherein the at least one object is characterized by at least one of a size, a shape, a volume, a position, an orientation and a spatial dimension;
xiii. wherein determining the ROI comprises calculating at least one of a two-dimensional volume and a three-dimensional volume;
D. ROI Display Module configured for:
a. Generating a visualization of the ROI and the plurality of mobile devices;
b. transmitting the visualization to at least one mobile device of the plurality of mobile devices;
c. receiving a selection associated with the visualization;
d. identifying one or more mobile devices associated with the selection;
e. transmitting one or more content streams captured by the one or more mobile devices;

According to some embodiments, disclosed herein is a method of estimating a Region Of Interest (ROI) corresponding to a plurality of content streams. The method may include receiving, by a system having at least one processor, a plurality of sensor data associated with a plurality of mobile devices. The plurality of sensor data corresponds to a plurality of content streams captured by the plurality of mobile devices. Further, each of the plurality of mobile devices may include at least one recorder configured to capture a corresponding content stream. Further, a sensor data associated with a mobile device may include a location data and an orientation data of the mobile device during capturing of a content stream. The method may further include, analyzing, by the system, the plurality of sensor data. Additionally, the method may include determining, by the system, a ROI based on at least the plurality of sensor data, thereby generating an estimation of the ROI.

In some embodiments, the method may further include receiving, by the system, a plurality of optical characteristics corresponding to the plurality of mobile devices. Accordingly, determining the ROI may be based at least on the plurality of optical characteristics. In some embodiments, an optical characteristic of a mobile device may include a Field of View (FOV) of a lens comprised in the mobile device. In some embodiments, the method may further include receiving a plurality of device identifiers from the plurality of mobile devices. Further, the plurality of optical characteristics may be identified based on at least the plurality of device identifiers.

In some embodiments, analyzing the plurality of sensor data may include determining a plurality of origin points based at least on a plurality of location data corresponding to the plurality of mobile devices. Further, analyzing the plurality of sensor data may include determining a plurality of vectors associated with the plurality of origin points based at least on a plurality of orientation data corresponding to the plurality of mobile devices. A vector associated with an origin point may originate at the origin point.

In some embodiments, determining the ROI may be based at least on the plurality of origin points and the plurality of vectors. In some embodiments, the plurality of origin points may be configured to be used as coordinates in a mapping coordinate system. In some embodiments, the method may further include determining a plurality of vector intersections of the plurality of vectors. In some embodiments, determining the ROI may be based at least on the plurality of vector intersections.

In some embodiments, the method may further include receiving a plurality of Field of Views (FOVs) associated with the plurality of mobile devices. A Field of View (FOV) associated with a mobile device may be associated with a lens comprised in the mobile device. Additionally, the method may further include determining a plurality of origin points based at least on a plurality of location data corresponding to the plurality of mobile devices. The plurality of origin points may be configured as coordinates in a mapping coordinate system. Additionally, the method may include determining a plurality of vectors associated with the plurality of origin points based at least on a plurality of orientation data corresponding to the plurality of mobile devices. A vector associated with an origin point may originate at the origin point. Further, the method may include generating a plurality of viewing frustums based at least on the plurality of FOVs. Furthermore, an apex of a viewing frustum associated with a mobile device may be coincident with the origin point associated with the mobile device. Further, a view direction of the viewing frustum may be aligned with the vector associated with the mobile device. Additionally, the method may include determining a plurality of intersections of the plurality of viewing frustums. Further, determining the ROI may be based at least on the plurality of intersections of the plurality of viewing frustums.

In some embodiments, determining a plurality of origin points may include converting a plurality of location data corresponding to the plurality of mobile devices into a plurality of origin points in a mapping coordinate system. Further, determining a plurality of vectors may include converting a plurality of orientation data corresponding to the plurality of mobile devices into a plurality of vectors associated with the plurality of origin points. Further, a vector associated with an origin point may originate at the origin point.

In some embodiments, the method may further include receiving the plurality of content streams from the mobile devices. Additionally, the method may include analyzing the plurality of content streams. Further, the method may include determining at least one object associated with the ROI. Furthermore, the method may include determining at least one spatial dimension associated with the at least one object. Accordingly, determining the ROI may be based at least on the at least one spatial dimension.

In some embodiments, the method may further include receiving the plurality of content streams from the mobile devices. Further, the method may include analyzing the plurality of content streams. Additionally, the method may include determining at least one object associated with the ROI based at least on the plurality of content streams. Furthermore, the method may include determining at least one spatial dimension associated with the at least one object based at least on a predetermined association between a plurality of objects and a plurality of spatial dimensions. Additionally, the method may include determining a plurality of distances corresponding to the plurality of mobile devices and the ROI. Further, a distance between a mobile device and the ROI may be estimated based on a spatial dimension of the at least one object determined in a content stream captured by the mobile device. Accordingly, determining the ROI may be based at least on the plurality of distances.

In some embodiments, determining the plurality of distances may include determining a plurality of distances corresponding to the plurality of mobile devices. Further, a distance between a mobile device and the ROI may be determined based at least on a spatial dimension of the at least one object determined in a content stream captured by the mobile device.

In some embodiments, the sensor data further may include a distance data representing a distance of the mobile device from at least one object comprised in the ROI. Further, the mobile device may include a ranging sensor configured to determine the distance. In some embodiments, the ranging sensor may include a LIDAR sensor, an image sensor, or a combination thereof.

In some embodiments, the method may further include executing a search on a venue database based on the location data. Further, the method may include determining the venue from a venue database based at least on the location data. Additionally, the method may include retrieving at least one spatial characteristic of the venue. Accordingly, determining the ROI may be based at least on the at least one spatial characteristic.

In some embodiments, the plurality of mobile devices may include a drone configured for flight. In some embodiments, the method may further include determining at least one trajectory associated with at least one mobile device based at least on analysis of the plurality of sensor data. Accordingly, determining the ROI may be based at least on the at least one trajectory.

In some embodiments, the method may further include generating a visualization of the ROI and the plurality of mobile devices. Additionally, the method may include transmitting the visualization to at least one mobile device of the plurality of mobile devices. In some embodiments, the method may further include receiving a selection associated with the visualization. Further, the method may include identifying one or more mobile devices associated with the selection. Furthermore, the method may include transmitting one or more content streams captured by the one or more mobile devices.

II. Platform Configuration

FIG. 1A is an illustration of a platform consistent with various embodiments of the present disclosure. The online platform 100 may include a content capturing module and a sensor data generation module 125. The content capturing and sensor data generation module may include a plurality of recording devices, such as, but not limited to, a mobile device with camera, a camera drone, a tripod mounted camera, CCTV cameras and so on. Further, the plurality of recording devices may further include one or more sensors, such as but not limited to, location sensor, orientation sensor, motion sensor, speed sensor, direction of travel sensor and so on. Accordingly, the content capturing module and sensor data generation module 125 may be configured to generate and transmit multiple streams of sensor data corresponding to the plurality of recording devices. Similarly, the content capturing module and sensor data generation module 125 may be configured to generate and transmit multiple streams of content (e.g., video, audio etc.) captured by the plurality of recording devices.

Further, the platform 100 may include a content transmission module 135 configured to communicate with the content capturing and sensor data generation module 125 over a communication network 112. Accordingly, the content transmission module 135 may be configured to receive multiple streams of sensor data and/or content transmitted by the content capturing and sensor data generation module 125.

Furthermore, the platform 100 may include an ROI estimation module 145 configured to estimate ROI based on the multiple streams of sensor data and/or content transmitted by the content capturing and sensor data generation module 125.

Additionally, the platform 100 may include an ROI display module 155 configured for generating a visual display of the ROI. For example, the ROI display module 155 may be comprised in an electronic device (such as a smartphone, a laptop computer, a tablet computer, a desktop computer, a wearable computer etc.) operated by a user 105.

By way of non-limiting example, the online platform 100 for estimating ROI based on multiple streams of sensor data may be hosted on a centralized server 110, such as, for example, a cloud computing service. The centralized server may communicate with other network entities, such as, for example, a plurality of mobile devices 120A, electronic devices 120B (such as desktop computers, laptop computers etc.) and one or more recording devices 120C, (e.g., smartphone cameras, digital cameras, camera drones 120D etc.) over a communication network 112, such as, but not limited to, the Internet. Further, users of the platform may include, but are not limited to, content creators 115 (e.g., live streamers), content consumers 105 (e.g., viewers/listeners of live streams) and platform managers (e.g., administrator or moderator). Accordingly, electronic devices operated by the content creators, content consumers and platform managers may be in communication with the platform.

A user, such as a content creator 115, a content consumer 105 or a moderator, may access platform 100 through a software application. The software application may be embodied as, for example, but not be limited to, a website, a web application, a desktop application, and a mobile application compatible with a computing device 1500. One possible embodiment of the software application may be provided by Shouty-Live™ products and services.

Accordingly, in an instance, the user 115 may be a content creator. Accordingly, an electronic device, such as recording device 120C, operated by the user 115, may be configured to generate sensor data (e.g., location data and orientation data) and capture content (e.g., audio, video etc.). Accordingly, the recording device may include one or more of a location sensor for sensing geolocation, an orientation sensor for sensing orientation of a mobile device along one or more axis, a ranging sensor for sensing distance of an object from the mobile device, a sound sensor for sensing sound, a light sensor for sensing light intensity, a motion sensor for sensing movement of the mobile device, an accelerometer and one or more environmental sensors for sensing environmental variables (e.g., temperature, humidity, etc.). For example, the user 115 may be a member of the audience in a music concert recording and live-streaming the music concert. Accordingly, a location of the user 115 (i.e., a geographical location) and orientation of the recording device 120C may be regularly determined and transmitted as a stream of sensor data. Further, the user 115 may provide event information and/or venue information in addition to capturing content (audio and/or video).

In yet another instance, the user 105 may be a content consumer. Accordingly, the user 105 may provide a selection input based on which one or more of content streams may be selected and presented to the user 105. Further, the user 105 may provide user selections on a visualization of ROI including positions of various recording devices (i.e., smartphone cameras, tripod mounted cameras, drone cameras etc.) in relation to the ROI. Accordingly, the content streams captured by recording devices corresponding to the user selection may be retrieved and transmitted to the electronic device operated by the user 105. Additionally, the user 105 may provide a search query using metadata such as location data, orientation data, etc. and retrieve content streams corresponding to the specified metadata.

As will be detailed with reference to FIG. 15 below, the computing device through which the ROI estimation platform may be accessed may comprise, but not be limited to, for example, a desktop computer, laptop, a tablet, or mobile telecommunications device. As will be detailed with reference to FIG. 15 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

FIG. 1B illustrates various system modules, namely, content capturing and sensor data generation module 125, ROI estimation module 145, ROI display module 155 and content transmission module 135. As shown, the content transmission module 135 mediates communication between the system modules.

Figure 2:
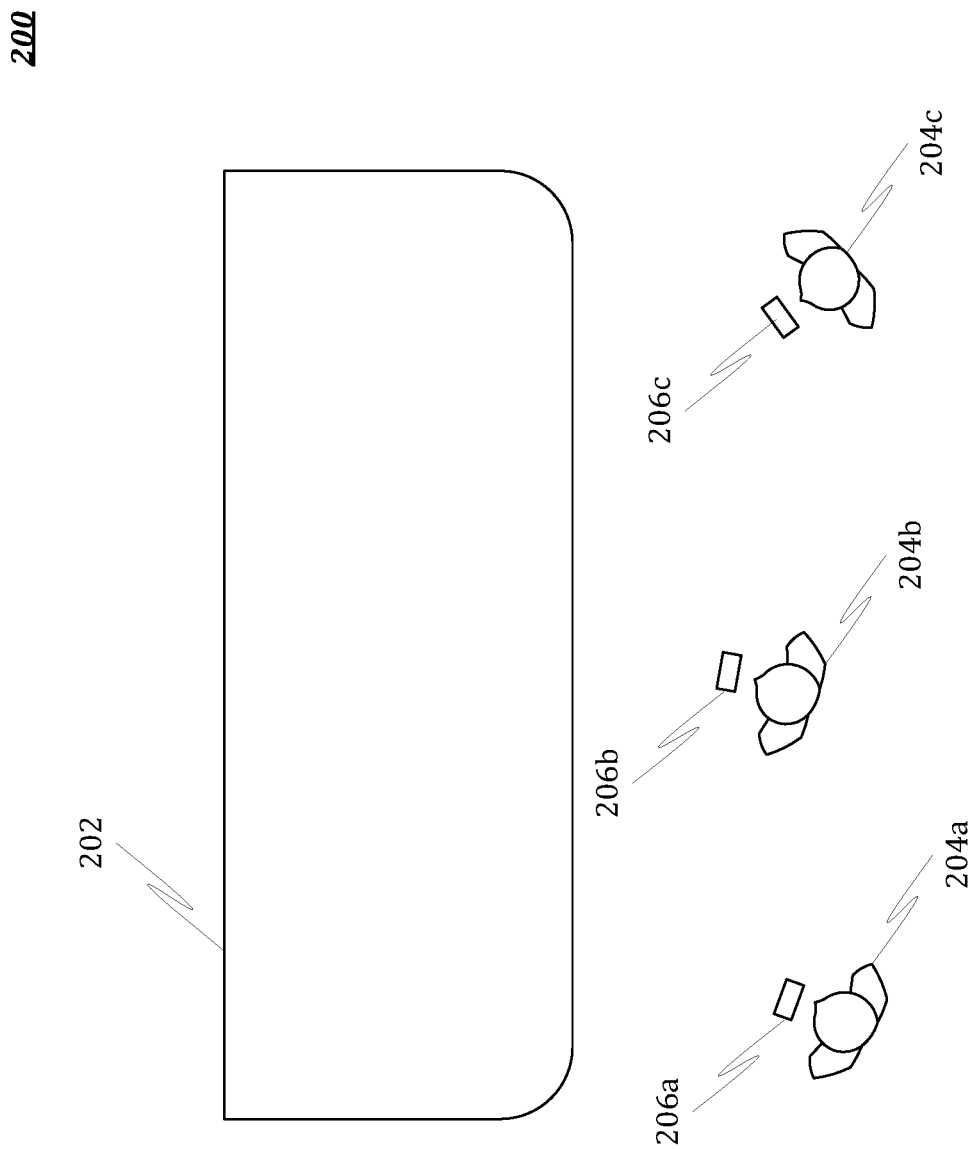
FIG. 2 illustrates a top view of a plurality of users recording an event using an associated plurality of recording devices, in accordance with some embodiments.

FIG. 2 illustrates a top view of a plurality of users recording an event using an associated plurality of recording devices, in accordance with some embodiments. The event may be occurring on an area 202 (such as a stage of a concert hall). Accordingly, a plurality of users 204 (such as 204a, 204b and 204c) may be situated at different locations in relation to the area 202. Further, the plurality of users 204 may be recording the event with a plurality of recording devices (such as 206a, 206b and 206c). Examples of recording devices may include, but are not limited to, smartphone cameras, digital cameras, IP cameras, tripod mounted cameras, CCTV cameras, sound recording devices, etc. Furthermore, the recording devices may include one or more sensors such as, but not limited to, location sensor (e.g., GPS receiver), orientation sensor (e.g., electronic compass), a motion sensor (e.g., accelerometer), a speed sensor etc. As a result, the recording devices 206 may generate a stream of sensor data and/or a stream of content (e.g., audio, video, multimedia). Further, such streams of sensor data and/or content may be time-stamped based on a standard time base (e.g., time provided by cellular network provider). Alternatively, each of the plurality of recording devices 206 may include an application configured to receive a synchronization data in order to synchronize a local timer with an external standard timer (e.g., a timer on a server). As a result, the stream of sensor data and/or content may be correlated in time. In other words, a given time instant, sensor data from each of the plurality of recording devices 206 may be identified and collected.

The area 202 is an example of a Region Of Interest (ROI) as referred to in the present disclosure. Further, the methods and systems disclosed herein estimate the ROI based on the stream of sensor data and/or content captured by the plurality of recording devices 206. In an instance, the ROI is estimated based on locations of the plurality of recording devices 206 and the orientations of the plurality of recording devices 206. Accordingly, location and orientation may be represented geometrically in the form of origin points and vectors for facilitating estimation of the ROI.

Figure 3:
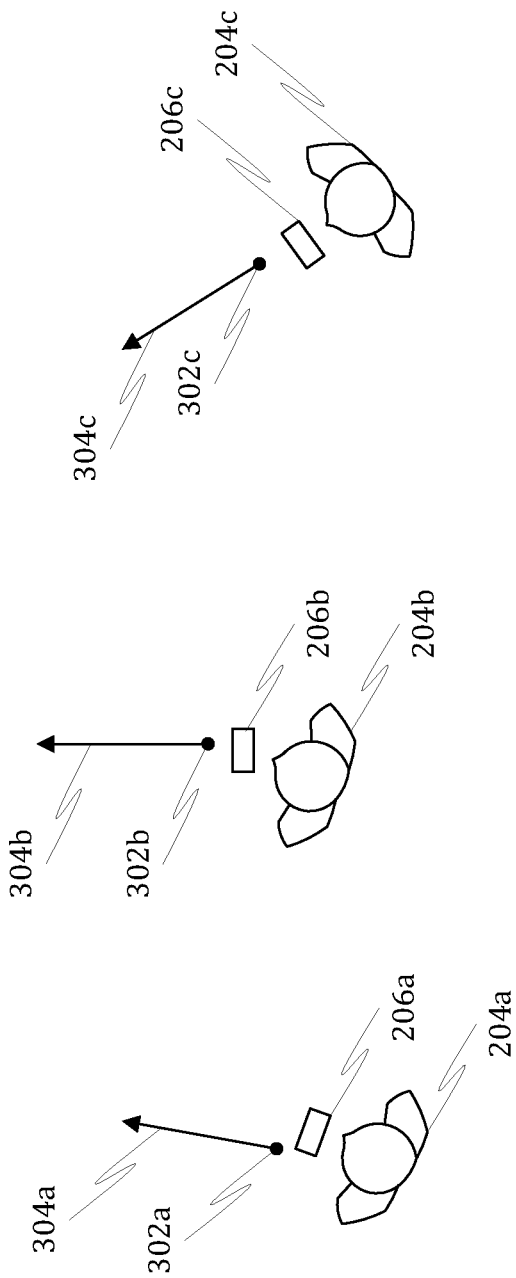
FIG. 3 illustrates construction of origin points corresponding to locations of the recording devices and vectors corresponding to the orientation of the recording devices for ROI estimation, in accordance with some embodiments.

Specifically, FIG. 3 illustrates construction of origin points corresponding to locations of the mobile devices and vectors corresponding to the orientation of the recording devices for ROI estimation, in accordance with some embodiments. Based on location data corresponding to the plurality of recording devices 206, a plurality of origin points 302 may be constructed. For example, origin point 302a corresponding to location of recording device 206a, origin point 302b corresponding to location of recording device 206b and origin point 302c corresponding to location of recording device 206c may be constructed. In an instance, the location data may be two-dimensional and include latitude and longitude. In another instance, the location may be three-dimensional and accordingly include latitude, longitude and altitude. Accordingly, a corresponding coordinate space (i.e., 2D or 3D) may be constructed. Further, co-ordinates of the plurality of origin points 302 may be identical to the corresponding latitude, longitude and altitude values of the location data. Alternatively, in an instance, the latitude, longitude and altitude values may be normalized in order to generate the co-ordinates of the plurality of origin points 302. In other words, a spatial frame of reference for the plurality of origin points 302 may be different from that of the location data.

Further, based on orientation data corresponding to the plurality of recording devices 206, a plurality of vectors 304 may be constructed. For example, vector 304a representing the orientation of recording device 206a, vector 304b representing the orientation of recording device 206b and vector 304c representing the orientation of recording device 206c may be constructed. Further, based on the dimensionality of the location data, the plurality of vectors 304 may be 2D or 3D. Furthermore, in some instances, the dimensionality of both the plurality of origin points 302 and the plurality of vectors 304 may be less than the dimensionality of the location data and the orientation data.

Further, the plurality of vectors 304 may be extended to allow for intersection between the plurality of vectors 304. Based on the intersection points between the plurality of vectors 304, the ROI may be estimated. For example, a high spatial density of intersection points may be an approximate indication of the ROI. However, in order to determine the ROI with greater accuracy, field of views of the plurality of recording devices 206 may be taken into account.

Figure 4:
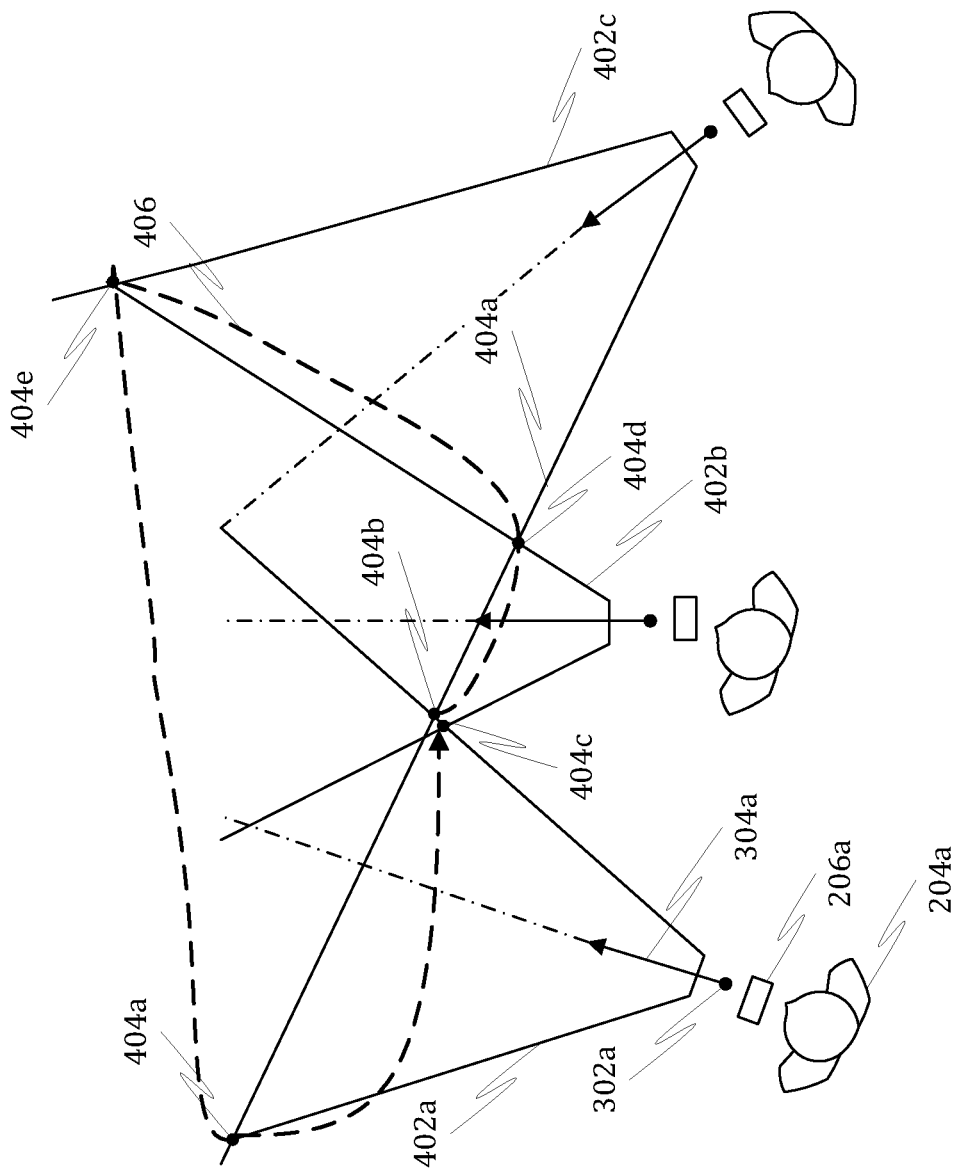
FIG. 4 illustrates construction of origin points corresponding to locations of the recording devices, vectors corresponding to the orientation of the recording devices and 2D viewing frustums centered on the origin points for ROI estimation, in accordance with some embodiments.

Accordingly, FIG. 4 illustrates ROI estimation based on construction of origin points corresponding to locations of the recording devices, vectors corresponding to the orientation of the recording devices and 2D viewing frustums centered on the origin points, in accordance with some embodiments. As illustrated, a plurality of viewing frustums 402 corresponding to the plurality of recording devices 206 may be constructed in the coordinate space. For example, viewing frustum 402a corresponding to recording device 206a, viewing frustum 402b corresponding to recording device 206b and viewing frustum 402c corresponding to recording device 206c may be constructed based on optical characteristics, such as, but not limited to, Field of View (FOV) of lens comprised in recording device 206a, 206b and 206c respectively. Accordingly, the FOV values of the recording devices 206 may be determined and transmitted by the recording devices 206 along with location data and orientation data. Alternatively, the recording devices 206 may be configured to transmit device information (e.g., model number, product code etc.) which may enable the platform 100 to automatically identify the corresponding FOV values by querying a device information database.

Accordingly, based on a FOV value of a recording device 206, a corresponding viewing frustum 402 may be constructed centered on the corresponding origin point 302 and oriented along the corresponding vector 304. For example, viewing frustum 402 may be constructed with the center point proximal to the origin point 302a while the orientation of the viewing frustum 402 is along the direction of the vector 304a.

Subsequently, the viewing frustums 402 may be extended to allow for intersections. Accordingly, a plurality of intersections 404 (e.g., 404a-e) between the viewing frustums 402 may be formed. Thereafter, by interconnecting intersection points 404 lying on the periphery of a cluster of intersection points 404, the ROI 406 may be estimated. In some embodiments, certain intersection points 404 may be excluded from consideration by taking into account prior knowledge about spatial characteristics of a venue where the plurality of recording devices are situated. Additionally, in some embodiments, the ROI may be approximated based on closest match to a predetermined shapes of areas (e.g., rectangular, spherical, elliptical, etc.).

Figure 5:
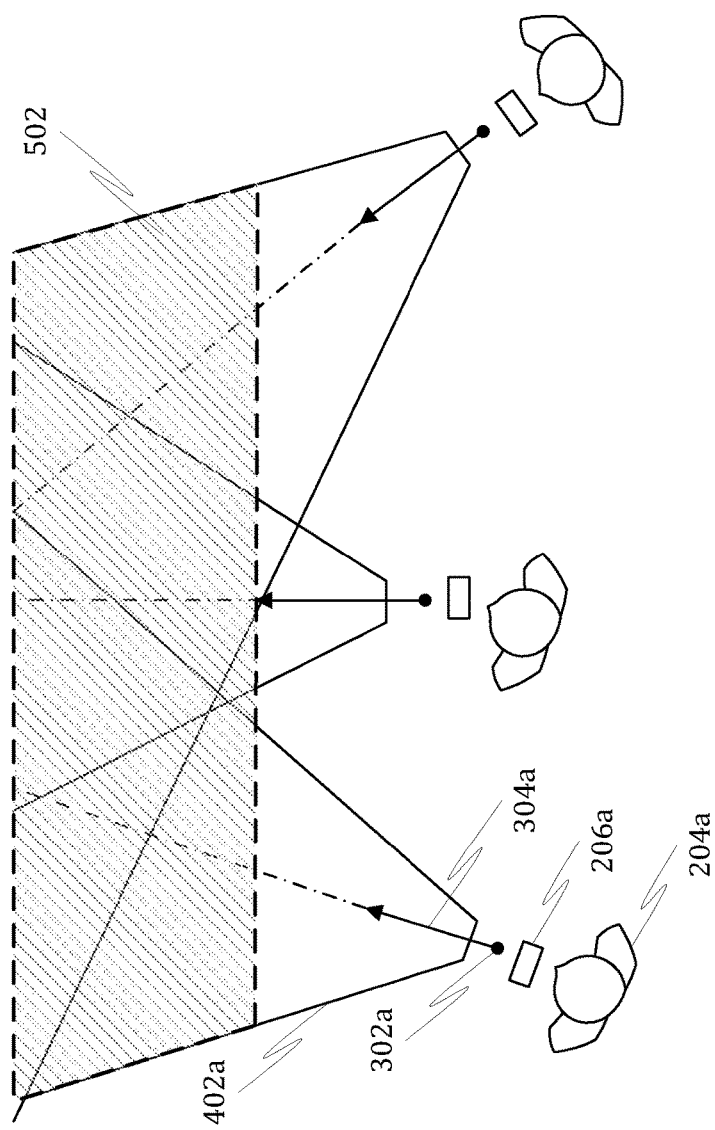
FIG. 5 illustrates ROI estimated based on construction of origin points corresponding to locations of the recording devices, vectors corresponding to the orientation of the recording devices and viewing frustums centered on the origin points, in accordance with some embodiments.

FIG. 5 illustrates ROI estimated based on construction of origin points corresponding to locations of the recording devices, vectors corresponding to the orientation of the recording devices and viewing frustums centered on the origin points, in accordance with some embodiments. As illustrated, the ROI 502 may be determined based on spatial distribution of intersection points corresponding to intersection of the plurality of viewing frustums 402.

Figure 6:
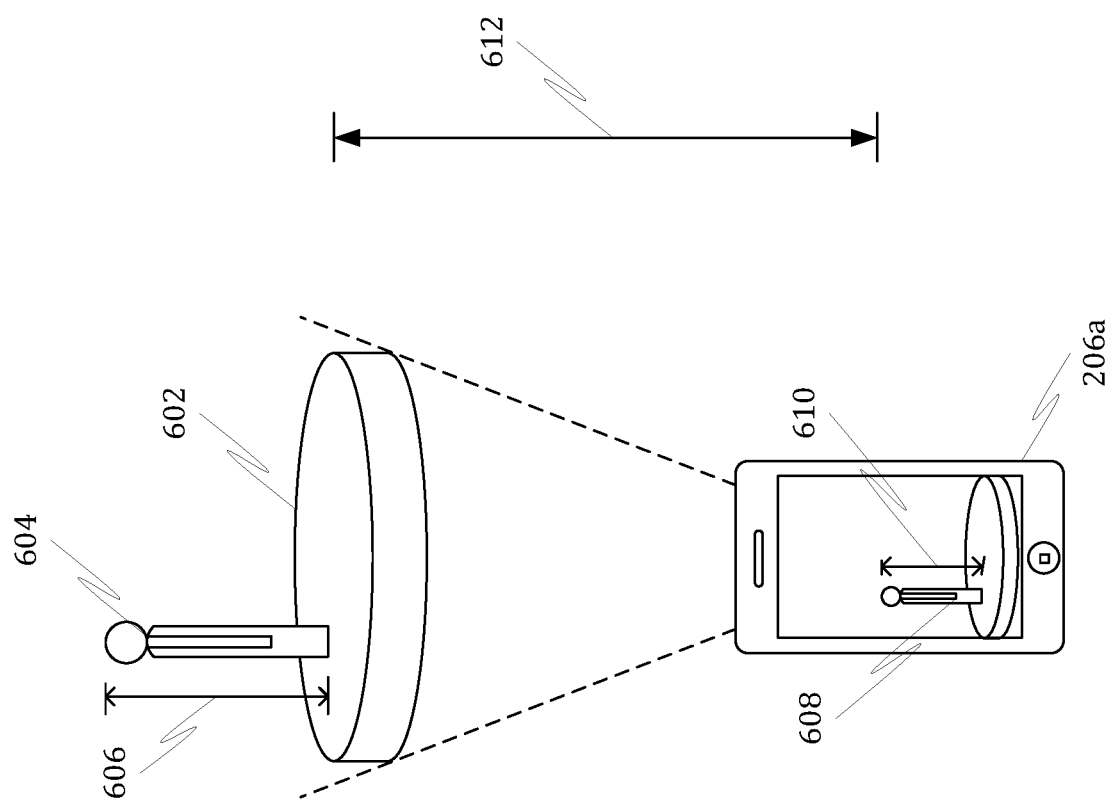
FIG. 6 illustrates estimation of ROI based on calculating a distance between a mobile device and an object within the ROI using image analysis, in accordance with some embodiments.

FIG. 6 illustrates estimation of ROI based on calculating a distance between a recording device and an object within the ROI using image analysis, in accordance with some embodiments. As shown, the event may be taking place in a physical space 602 involving one or more objects 604 (e.g., a person). Further, the object may be associated with a spatial dimension 606, such as, for example, height. When the event is captured by a recording device 206 (e.g., 206*a*), an image 608 of the object 604 may be formed. Further, a spatial dimension 610 of the image object 604 may be determined using image analysis. Moreover, by using image analysis, the real world object corresponding to the image object 604 may be determined. In other words, image analysis may be performed to identify one or more objects being captured by the recording device 206. As a result, based on prior knowledge about spatial characteristics of various objects, the platform may calculate a distance 612 between the recording device 206*a* and the object 604. For instance, once the object 604 is detected to be a human, a predetermined average height of the human may be used in computing the distance 612.

Accordingly, distances between recording devices 206 and one or more objects 604 in the ROI may be computed. These distances may then be taken into account in estimating the ROI. In particular, by utilizing these distances, a shape and/or size of the ROI may be calculated more accurately.

Figure 7:
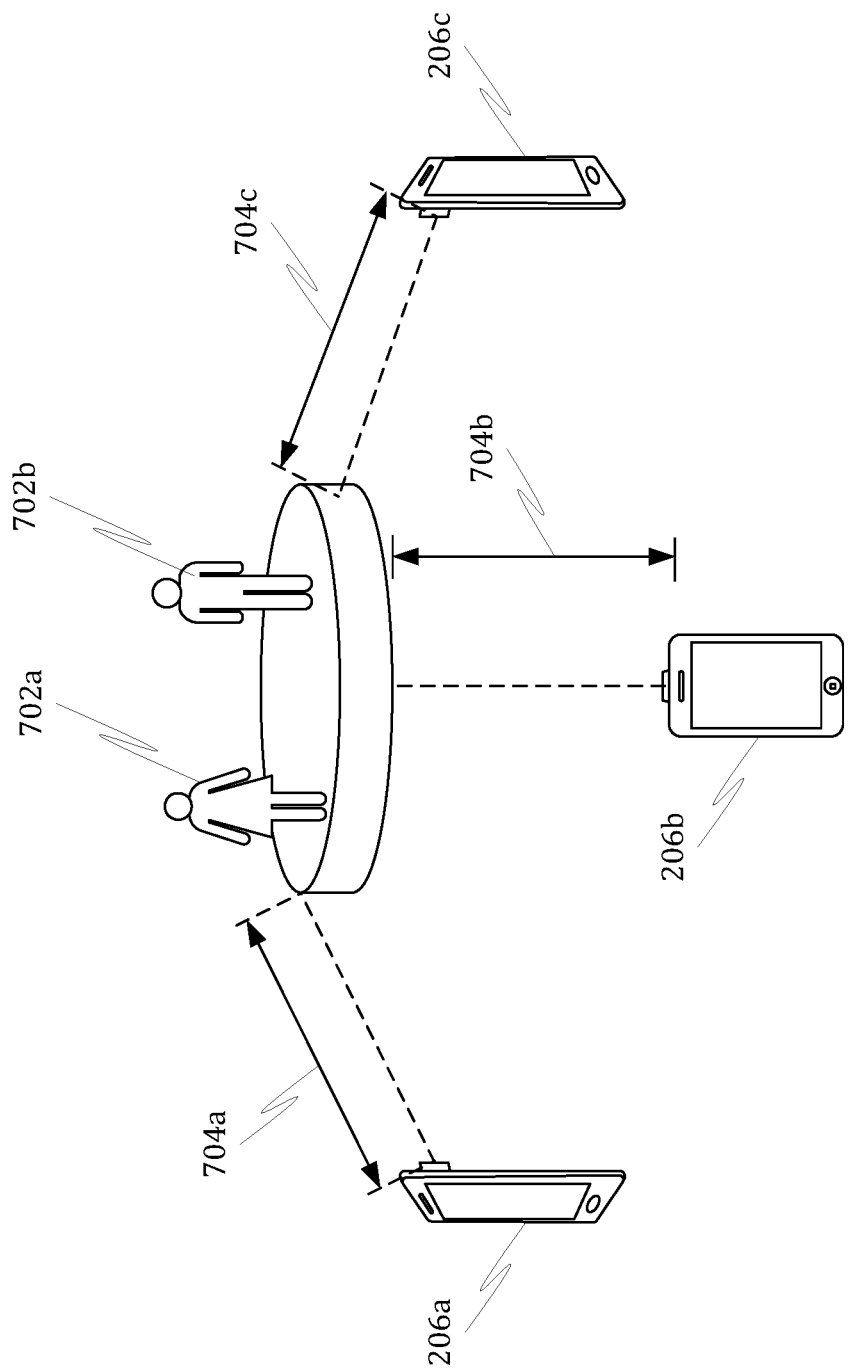
FIG. 7 illustrates estimation of ROI based on calculating a plurality of distances between a plurality of recording devices and an object within the ROI using image analysis, in accordance with some embodiments.

FIG. 7 illustrates estimation of ROI based on calculating a plurality of distances between a plurality of recording devices and an object within the ROI using image analysis, in accordance with some embodiments. As illustrated, the event may involve a physical space such as a stage upon which one or more objects 702 (e.g., persons 702*a* and 702*b*) may be performing. Further, the event may be captured by multiple recording devices, such as, recording devices 206*a*, 206*b* and 206*c*. Additionally, by utilizing image analysis (as explained in conjunction with FIG. 6), a plurality of distances 704 (e.g., 704*a*, 704*b* and 704*c*) may be computed between the plurality of recording devices 206 and the one or more objects 702. Subsequently, by taking into account the plurality of distances 704, a shape and/or size of the ROI may be calculated more accurately.

Figure 8:
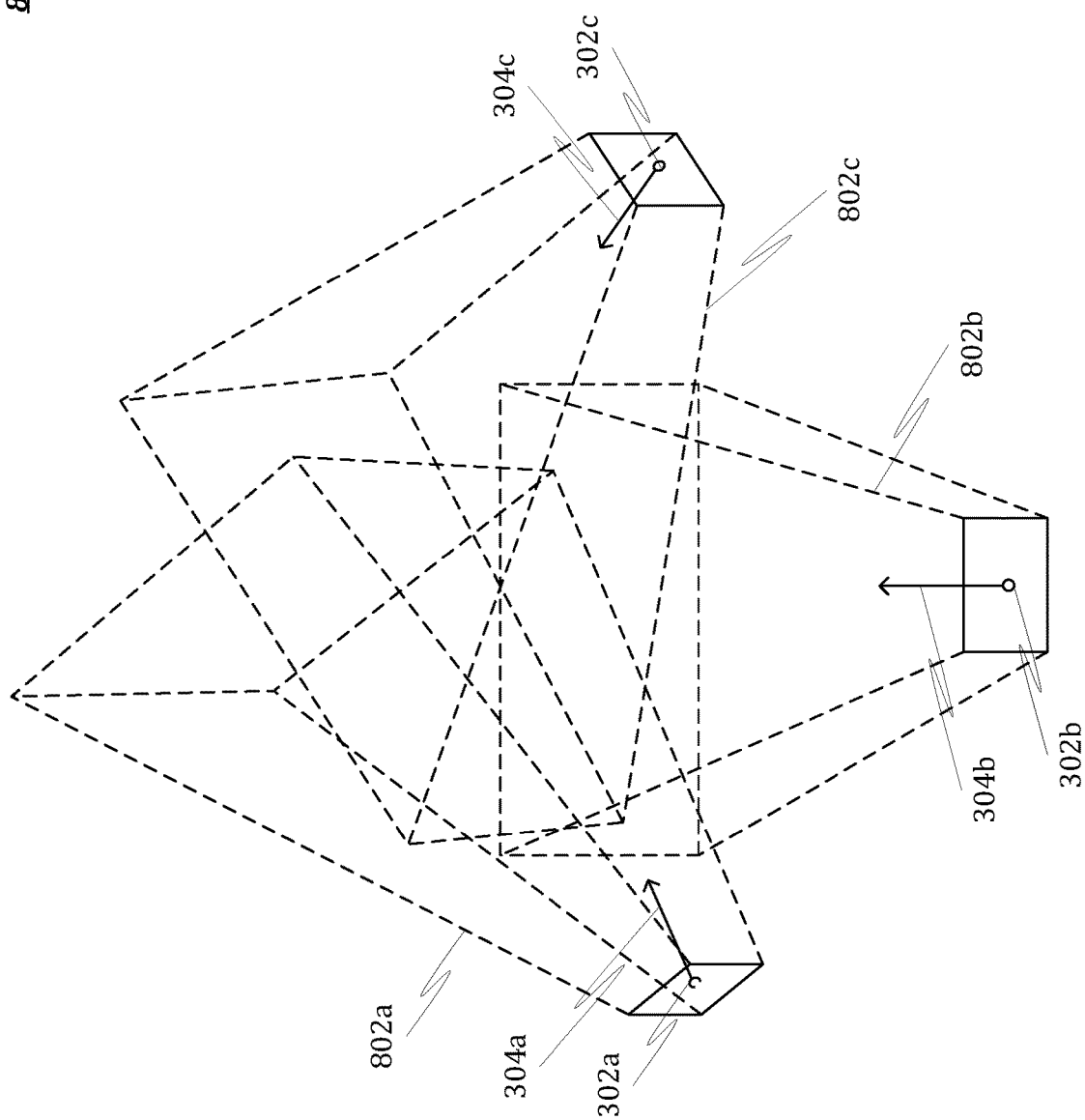
FIG. 8 illustrates construction of origin points corresponding to locations of the recording devices, vectors corresponding to the orientation of the recording devices and 3D viewing frustums centered on the origin points for ROI estimation, in accordance with some embodiments.

FIG. 8 illustrates construction of origin points corresponding to locations of the recording devices, vectors corresponding to the orientation of the recording devices and 3D viewing frustums centered on the origin points for ROI estimation, in accordance with some embodiments. As illustrated, a plurality of 3D viewing frustums 802 (e.g., 802*a*, 802*b* and 802*c*) may be constructed corresponding to the plurality of recording devices 206. Further, each 3D viewing frustum may be centered co-incident with a corresponding origin point. For example, 3D viewing frustum 802*a* is constructed with its center point coincident with the origin point 302*a* associated with the recording device 206*a*. In other words, an apex of a 3D viewing frustum 802 associated with a recording device 206 may be coincident with an origin point 302 associated with the corresponding recording device 206. Furthermore, a view direction of the 3D viewing frustum 802 may be aligned with the corresponding vector 304 associated with the origin point 302. Subsequently, a plurality of intersections of multiple viewing frustums 802 may be determined. Such determination may be performed computationally using coordinate geometry. Further, by computationally analyzing characteristics of the plurality of intersections of viewing frustums 802, the ROI may be estimated.

III. Platform Operation

Although methods 900 to 1400 have been described to be performed by platform 100, it should be understood that computing device 1500 may be used to perform the various stages of methods 900 to 1400. Furthermore, in some embodiments, different operations may be performed by different networked elements in operative communication with computing device 1500. For example, server 110 may be employed in the performance of some or all of the stages in methods 900 to 1400. Moreover, server 110 may be configured much like computing device 1500.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 900 to 1400 will be described in greater detail below.

Figure 9:
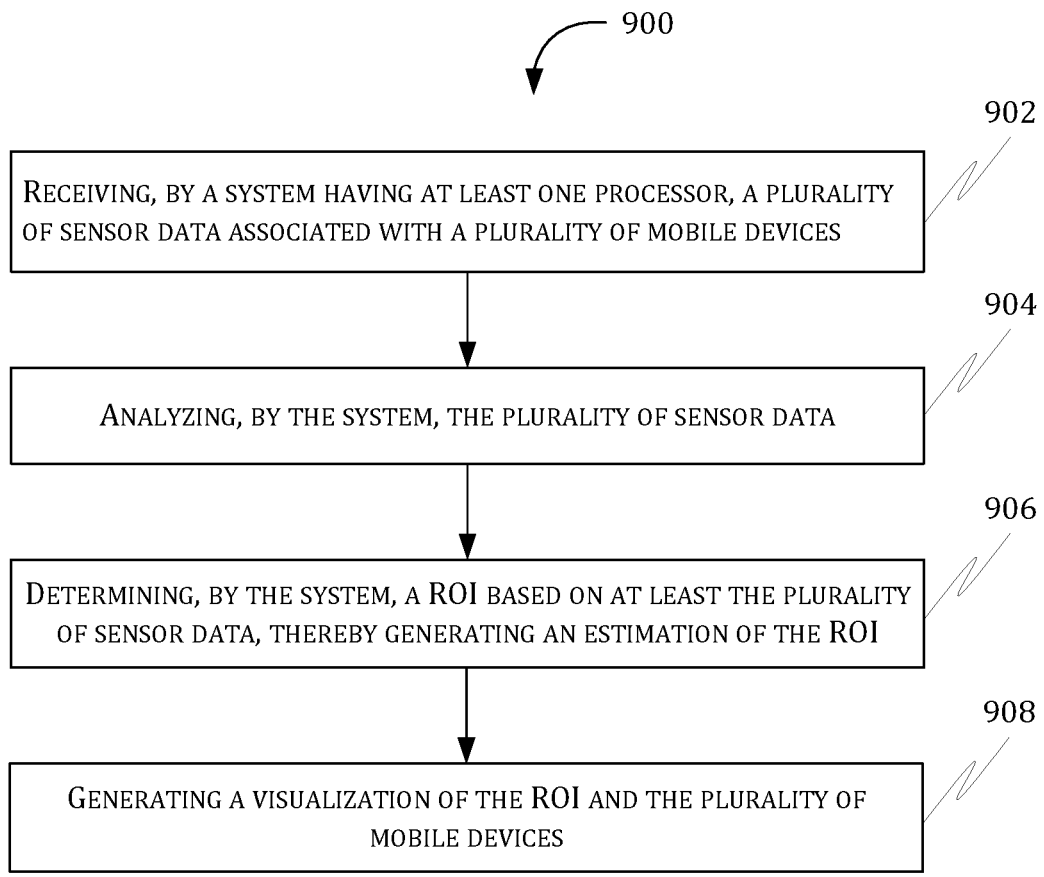
FIG. 9 illustrates a flowchart of a method 900 of estimating ROI based on sensor data captured by a plurality of recording devices and generating a visualization of the ROI including positions of the plurality of recording devices, in accordance with some embodiments.

FIG. 9 illustrates a flowchart of a method 900 of estimating ROI based on sensor data captured by a plurality of mobile devices and generating a visualization of the ROI including positions of the plurality of mobile devices, in accordance with some embodiments. The method 900 may include a stage 902 of receiving, by a system having at least one processor, a plurality of sensor data associated with a plurality of mobile devices. The plurality of sensor data corresponds to a plurality of content streams captured by the plurality of mobile devices. Further, each of the plurality of mobile devices may include at least one recorder configured to capture a corresponding content stream. Further, a sensor data associated with a mobile device may include a location data and an orientation data of the mobile device during capturing of a content stream.

In some embodiments, the method may further include receiving, by the system, a plurality of optical characteristics corresponding to the plurality of mobile devices. Accordingly, determining the ROI may be based at least on the plurality of optical characteristics. In some embodiments, an optical characteristic of a mobile device may include a Field of View (FOV) of a lens comprised in the mobile device. In some embodiments, the method may further include receiving a plurality of device identifiers from the plurality of mobile devices. Further, the plurality of optical characteristics may be identified based on at least the plurality of device identifiers.

The method 900 may further include a stage 904 of analyzing, by the system, the plurality of sensor data. In some embodiments, analyzing the plurality of sensor data may include determining a plurality of origin points based at least on a plurality of location data corresponding to the plurality of mobile devices. Further, analyzing the plurality of sensor data may include determining a plurality of vectors associated with the plurality of origin points based at least on a plurality of orientation data corresponding to the plurality of mobile devices. A vector associated with an origin point may originate at the origin point.

Additionally, the method 900 may include a stage 904 of determining, by the system, a ROI based on at least the plurality of sensor data, thereby generating an estimation of the ROI. In some embodiments, determining the ROI may be based at least on the plurality of origin points and the plurality of vectors. In some embodiments, the plurality of origin points may be configured to be used as coordinates in a mapping coordinate system. In some embodiments, the method may further include determining a plurality of vector intersections of the plurality of vectors. In some embodiments, determining the ROI may be based at least on the plurality of vector intersections.

Furthermore, the method 900 may include a stage 906 of generating a visualization of the ROI and the plurality of mobile devices.

In some embodiments, the plurality of mobile devices may include a drone configured for flight. In some embodiments, the method may further include determining at least one trajectory associated with at least one mobile device based at least on analysis of the plurality of sensor data. Accordingly, determining the ROI may be based at least on the at least one trajectory.

Figure 10:
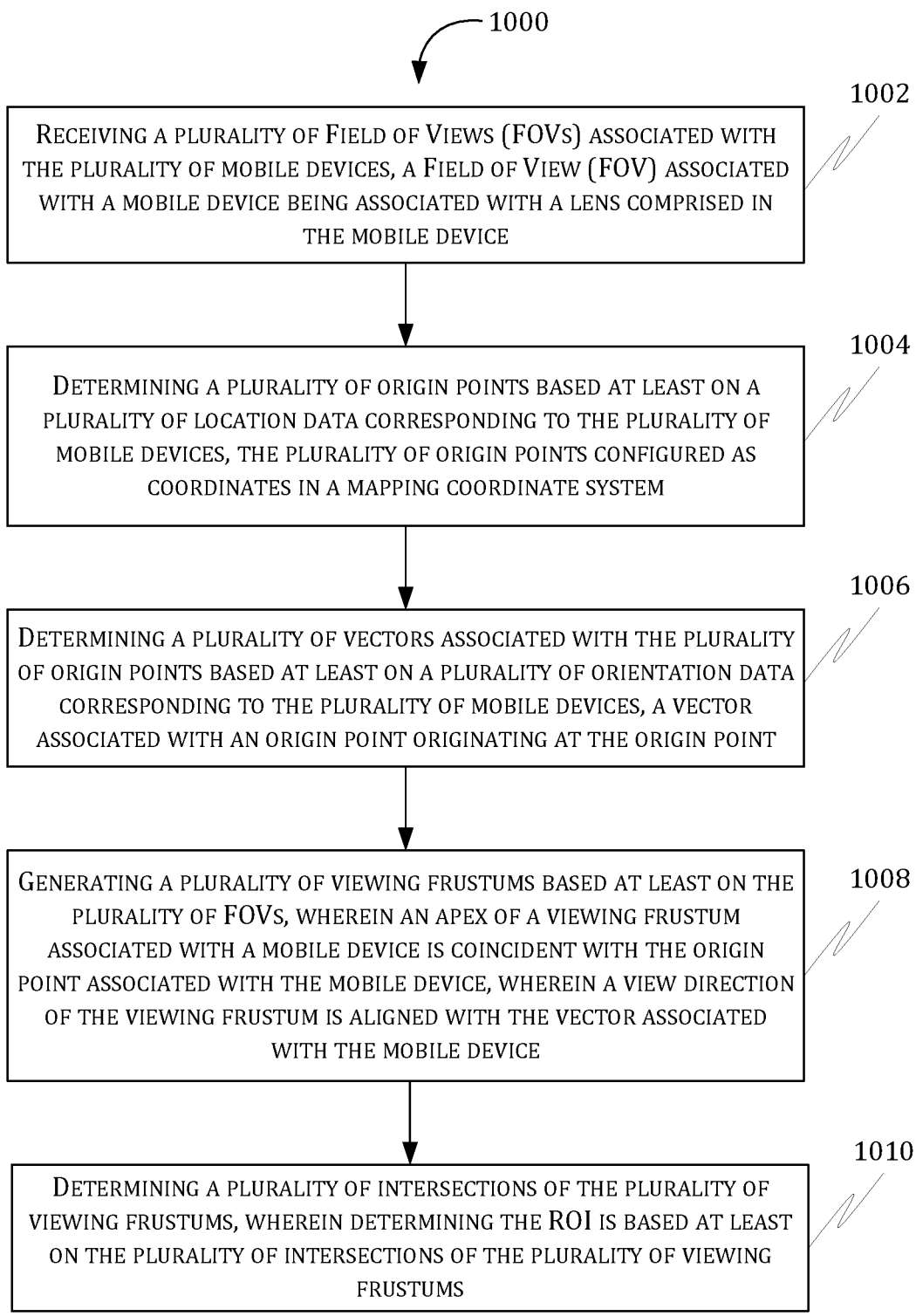
FIG. 10 illustrates a flowchart of a method 1000 of estimating ROI based on construction of origin points corresponding to locations of the recording devices, vectors corresponding to the orientation of the recording devices, viewing frustums centered on the origin points and intersections between the viewing frustums, in accordance with some embodiments.

FIG. 10 illustrates a flowchart of a method 1000 of estimating ROI based on construction of origin points corresponding to locations of the mobile devices, vectors corresponding to the orientation of the mobile devices, viewing frustums centered on the origin points and intersections between the viewing frustums, in accordance with some embodiments. Accordingly, the method 1000 may include a stage 1002 of receiving a plurality of Field of Views (FOVs) associated with the plurality of mobile devices. A Field of View (FOV) associated with a mobile device may be associated with a lens comprised in the mobile device. Additionally, the method 1000 may include a stage 1004 of determining a plurality of origin points based at least on a plurality of location data corresponding to the plurality of mobile devices. The plurality of origin points may be configured as coordinates in a mapping coordinate system. Additionally, the method 1000 may include a stage 1006 of determining a plurality of vectors associated with the plurality of origin points based at least on a plurality of orientation data corresponding to the plurality of mobile devices. A vector associated with an origin point may originate at the origin point. In some embodiments, determining a plurality of origin points may include converting a plurality of location data corresponding to the plurality of mobile devices into a plurality of origin points in a mapping coordinate system. Further, determining a plurality of vectors may include converting a plurality of orientation data corresponding to the plurality of mobile devices into a plurality of vectors associated with the plurality of origin points. Further, a vector associated with an origin point may originate at the origin point.

Further, the method 1000 may include a stage 1008 of generating a plurality of viewing frustums based at least on the plurality of FOVs. Furthermore, an apex of a viewing frustum associated with a mobile device may be coincident with the origin point associated with the mobile device. Further, a view direction of the viewing frustum may be aligned with the vector associated with the mobile device. Additionally, the method 1000 may include a stage 1010 of determining a plurality of intersections of the plurality of viewing frustums. Further, determining the ROI may be based at least on the plurality of intersections of the plurality of viewing frustums.

Figure 11:
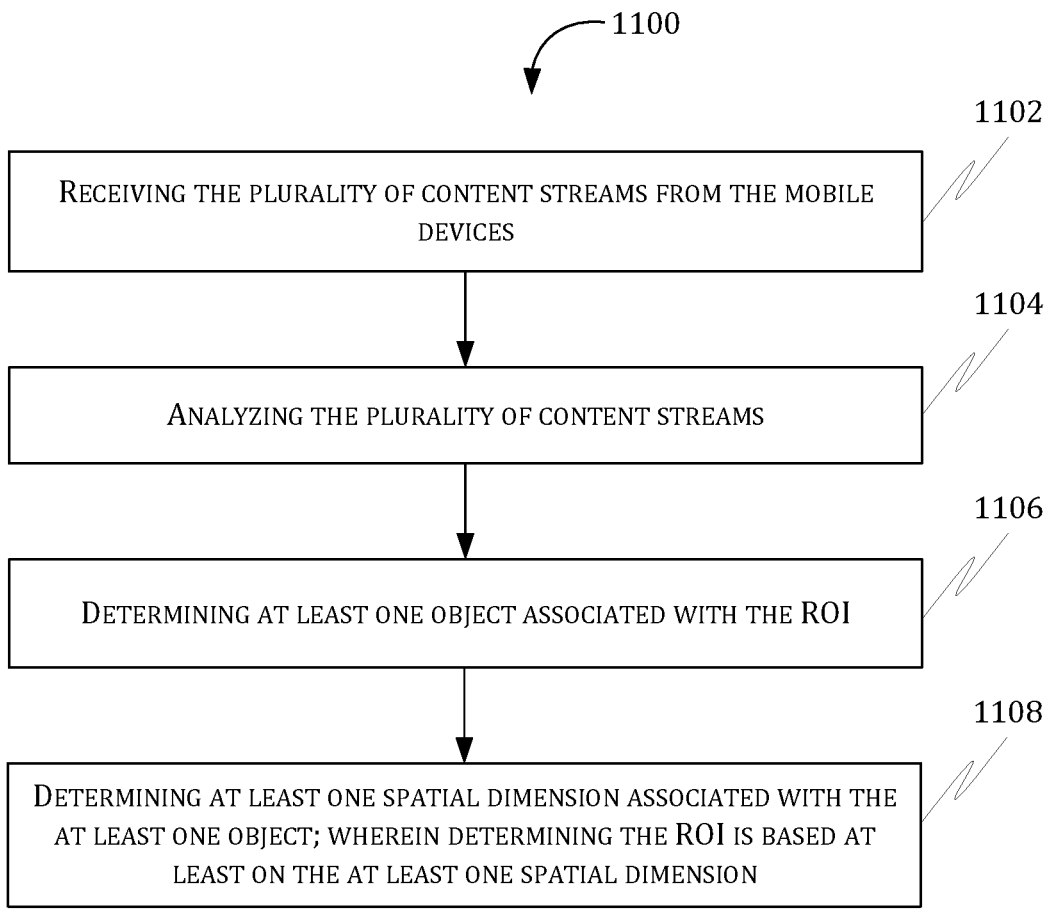
FIG. 11 illustrates a flowchart of a method 1100 of estimating ROI based on image analysis of content streams captured by a plurality of recording devices, in accordance with some embodiments.

FIG. 11 illustrates a flowchart of a method 1100 of estimating ROI based on image analysis of content streams captured by a plurality of mobile devices, in accordance with some embodiments. Accordingly, the method 1100 may include a stage 1102 of receiving the plurality of content streams from the mobile devices. Additionally, the method 1100 may include a stage 1104 of analyzing the plurality of content streams. Further, the method 1100 may include a stage 1106 of determining at least one object associated with the ROI. Furthermore, the method 1100 may include a stage 1108 of determining at least one spatial dimension associated with the at least one object. Accordingly, determining the ROI may be based at least on the at least one spatial dimension.

Figure 12:
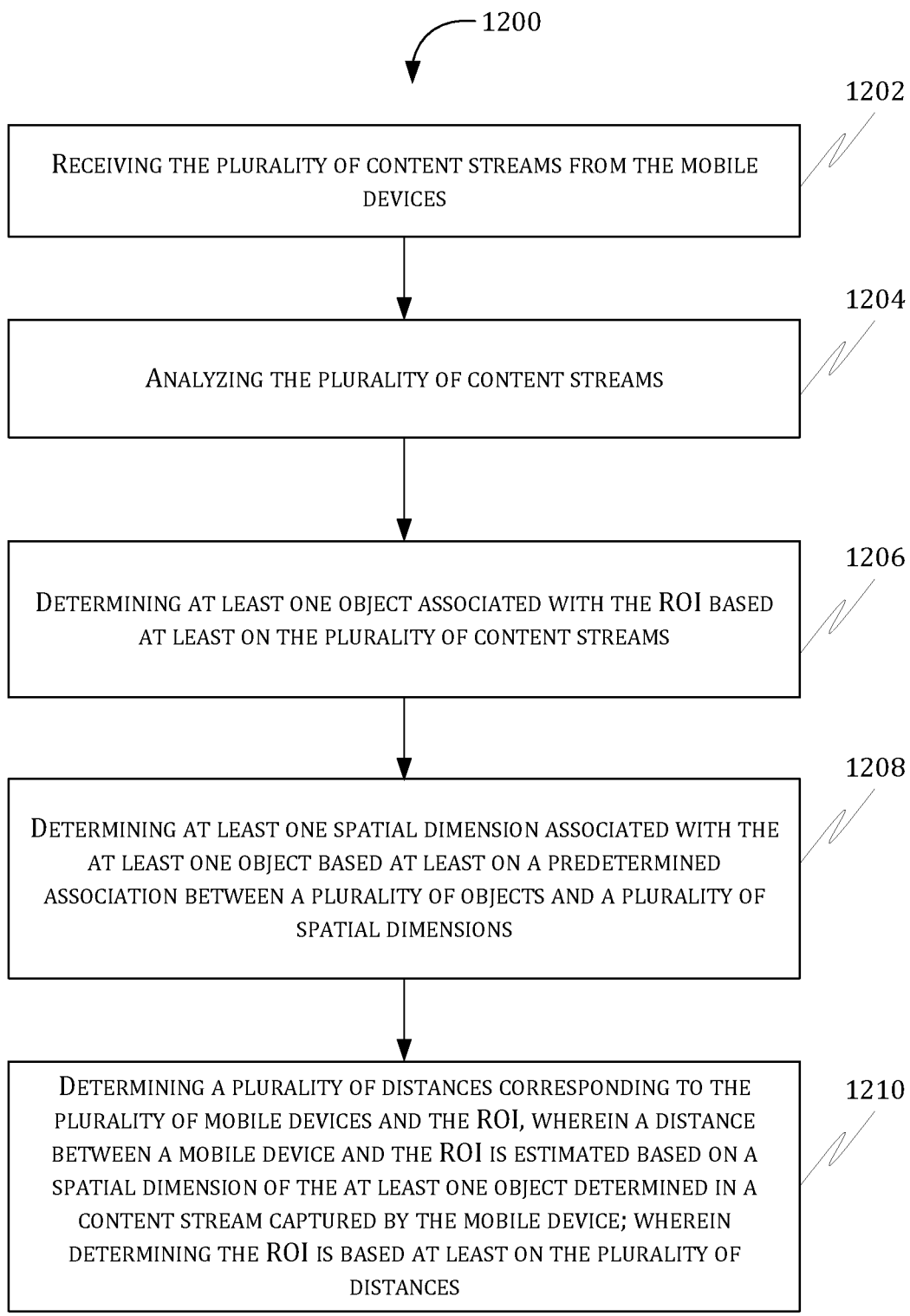
FIG. 12 illustrates a flowchart of a method 1200 of estimating ROI based on image analysis of content streams captured by a plurality of recording devices to calculate distances between the plurality of recording devices and an object within the ROI, in accordance with some embodiments.

FIG. 12 illustrates a flowchart of a method 1200 of estimating ROI based on image analysis of content streams captured by a plurality of mobile devices to calculate distances between the plurality of mobile devices and an object within the ROI, in accordance with some embodiments. Accordingly, the method 1200 may include a stage 1202 of receiving the plurality of content streams from the mobile devices. Further, the method 1200 may include a stage 1204 of analyzing the plurality of content streams. Additionally, the method 1200 may include a stage 1206 of determining at least one object associated with the ROI based at least on the plurality of content streams. Furthermore, the method 1200 may include a stage 1208 of determining at least one spatial dimension associated with the at least one object based at least on a predetermined association between a plurality of objects and a plurality of spatial dimensions. Additionally, the method 1200 may include a stage 1210 of determining a plurality of distances corresponding to the plurality of mobile devices and the ROI. Further, a distance between a mobile device and the ROI may be estimated based on a spatial dimension of the at least one object determined in a content stream captured by the mobile device. Accordingly, determining the ROI may be based at least on the plurality of distances.

In some embodiments, determining the plurality of distances may include determining a plurality of distances corresponding to the plurality of mobile devices. Further, a distance between a mobile device and the ROI may be determined based at least on a spatial dimension of the at least one object determined in a content stream captured by the mobile device.

In some embodiments, the sensor data further may include a distance data representing a distance of the mobile device from at least one object comprised in the ROI. Further, the mobile device may include a ranging sensor configured to determine the distance. In some embodiments, the ranging sensor may include a LIDAR sensor, an image sensor, or a combination thereof.

Figure 13:
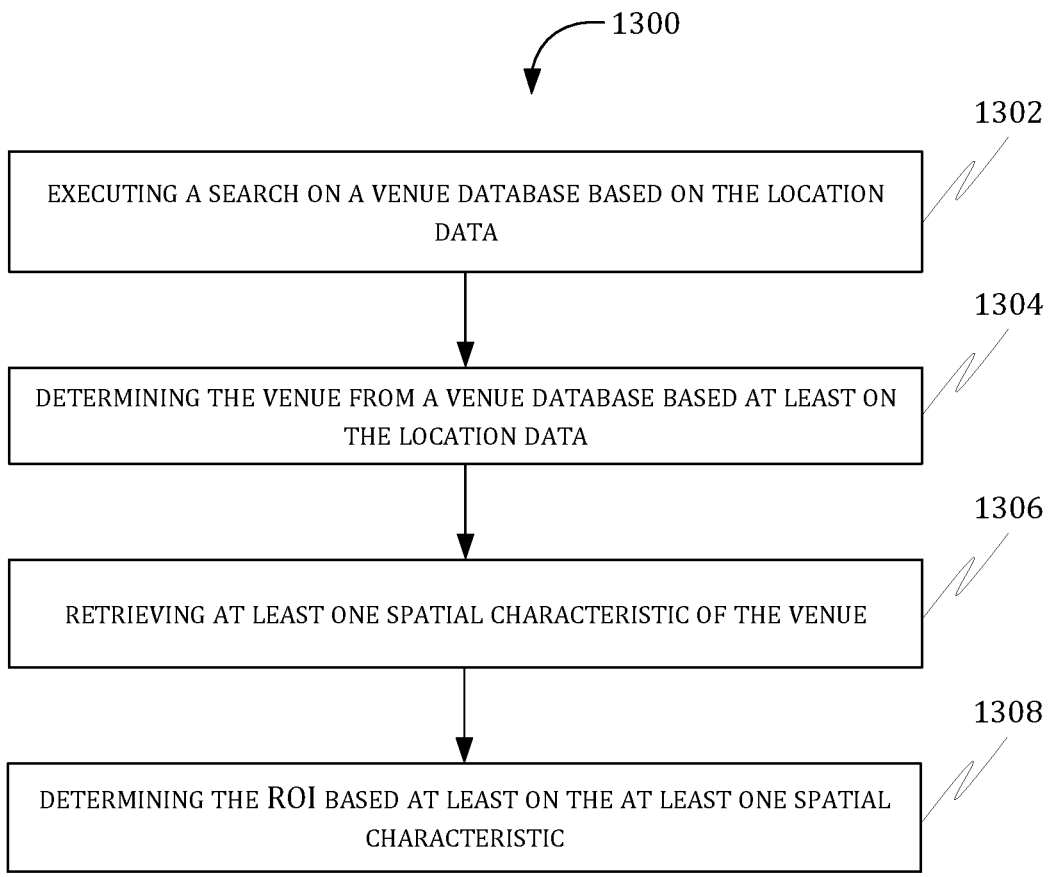
FIG. 13 illustrates a flowchart of a method 1300 of estimating ROI based on predetermined spatial characteristics of a venue, in accordance with some embodiments.

FIG. 13 illustrates a flowchart of a method 1300 of estimating ROI based on predetermined spatial characteristics of a venue, in accordance with some embodiments. Accordingly, the method 1300 may include a stage 1302 of executing a search on a venue database based on the location data. Further, the method 1300 may include a stage 1304 of determining the venue from a venue database based at least on the location data. Additionally, the method may include a stage 1306 of retrieving at least one spatial characteristic of the venue. Further, the method 1300 may include a stage 1308 of determining the ROI based at least on the at least one spatial characteristic.

Figure 14:
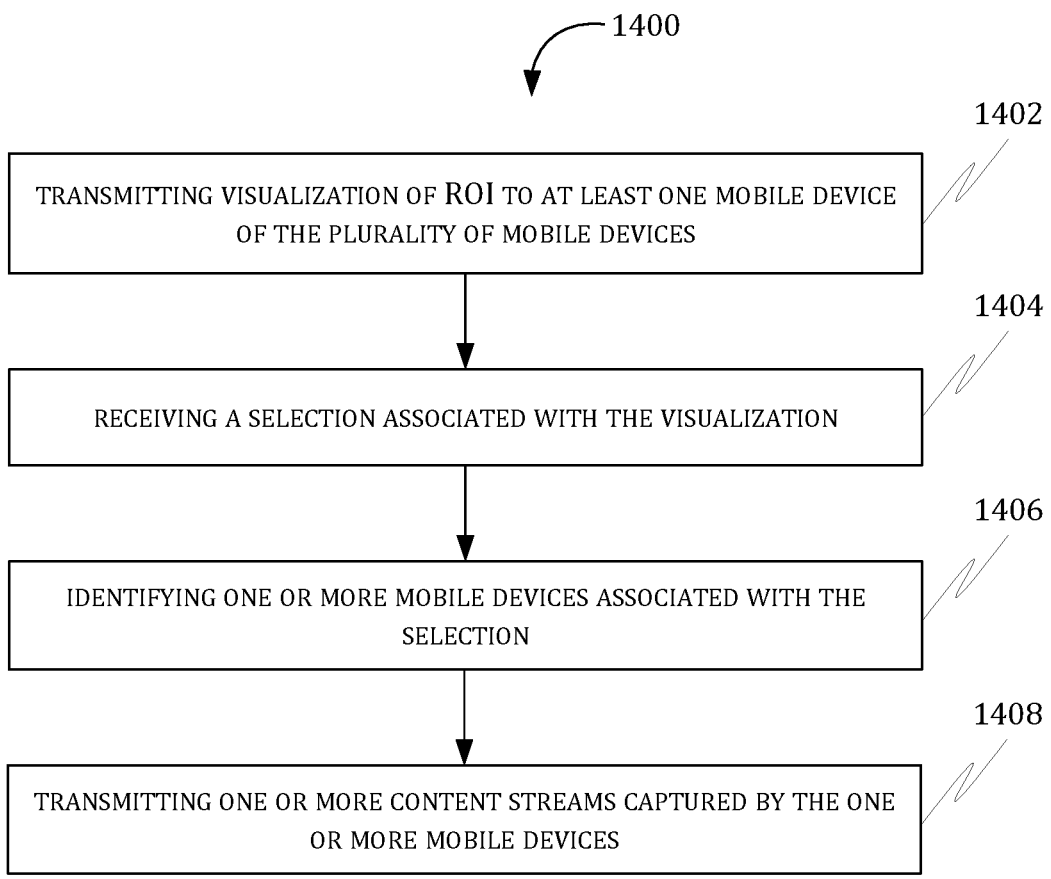
FIG. 14 illustrates a flowchart of a method 1400 of transmitting content streams based on user selections on a visualization of an ROI including multiple recording devices, in accordance with some embodiments.

FIG. 14 illustrates a flowchart of a method 1400 of transmitting content streams based on user selections on a visualization of an ROI including multiple mobile devices, in accordance with some embodiments. Accordingly, the method 1400 may include a stage 1402 of transmitting the visualization to at least one mobile device of the plurality of mobile devices. Further, the method 1400 may further include a stage 1404 of receiving a selection associated with the visualization. Furthermore, the method 1400 may include a stage 1406 of identifying one or more mobile devices associated with the selection. Additionally, the method 1400 may include a stage 1408 of transmitting one or more content streams captured by the one or more mobile devices.

IV. Platform Architecture

The platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 900 to 1400 have been described to be performed by a computing device 1500, it should be understood that, in some embodiments, different operations may be performed by different networked elements in operative communication with computing device 1500.

Embodiments of the present disclosure may comprise a system having a memory storage and a processing unit. The processing unit coupled to the memory storage, wherein the processing unit is configured to perform the stages of methods 900 to 1400.

Figure 15:
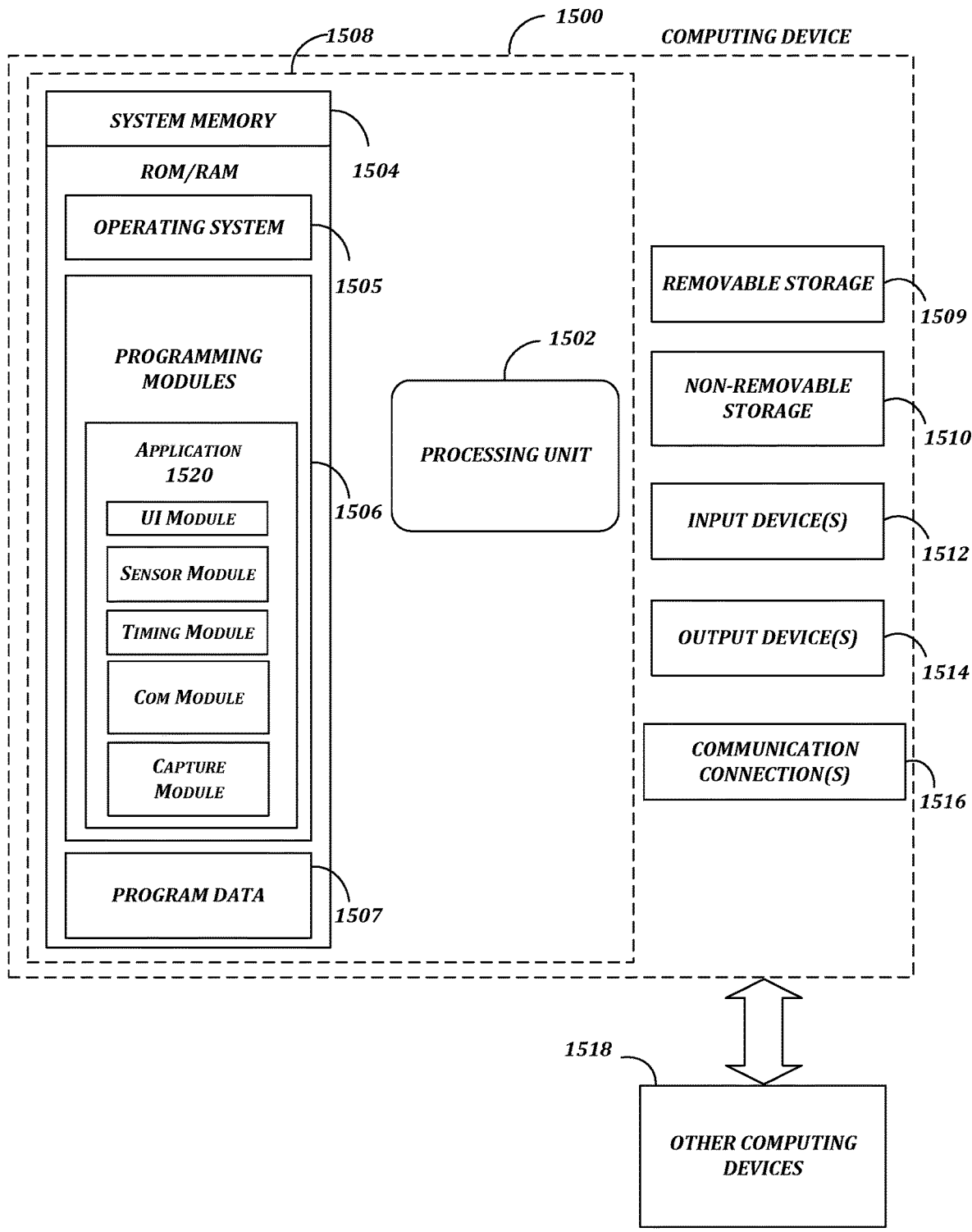
FIG. 15 illustrates a block diagram of a system 1500 for estimating ROI based on sensor data, in accordance with some embodiment.

FIG. 15 is a block diagram of a system including computing device 1500. Consistent with an embodiment of the disclosure, the aforementioned memory storage and processing unit may be implemented in a computing device, such as computing device 1500 of FIG. 15. Any suitable combination of hardware, software, or firmware may be used to implement the memory storage and processing unit. For example, the memory storage and processing unit may be implemented with computing device 1500 or any of other computing devices 1518, in combination with computing device 1500. The aforementioned system, device, and processors are examples and other systems, devices, and processors may comprise the aforementioned memory storage and processing unit, consistent with embodiments of the disclosure.

With reference to FIG. 15, a system consistent with an embodiment of the disclosure may include a computing device or cloud service, such as computing device 1500. In a basic configuration, computing device 1500 may include at least one processing unit 1502 and a system memory 1504. Depending on the configuration and type of computing device, system memory 1504 may comprise, but is not limited to, volatile (e.g., random access memory (RAM)), non-volatile (e.g., read-only memory (ROM)), flash memory, or any combination. System memory 1504 may include operating system 1505, one or more programming modules 1506, and may include a program data 1507. Operating system 1505, for example, may be suitable for controlling computing device 1500's operation. In one embodiment, programming modules 1506 may include the following modules: User Interface (UI) module, Sensor Data Generation Module (or Sensor Module), Timing Module, Content Capturing module (or Capture Module) and Communications (Com) Module. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and nonvolatile, removable and non-removable media implemented in any method or technology for storage of information, such as computer readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of device 1500. Computing device 1500 may also have input device(s) 1512 such as a keyboard, a mouse, a pen, a sound input device, a touch input device, etc. Output device(s) 1514 such as a display, speakers, a printer, etc. may also be included. The aforementioned devices are examples and others may be used.

Computing device 1500 may also contain a communication connection 1516 that may allow device 1500 to communicate with other computing devices 1518, such as over a network in a distributed computing environment, for example, an intranet or the Internet. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., application 1520) may perform processes including, for example, stages of one or more of methods 900 to 1400 as described above. The aforementioned process is an example, and processing unit 1502 may perform other processes. Other programming modules that may be used in accordance with embodiments of the present disclosure may include image encoding applications, machine learning application, image classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

According to various embodiments, the present disclosure includes at least the following aspects:

Aspect 1: A method of estimating a Region Of Interest (ROI) corresponding to a plurality of content streams, the method comprising: receiving, by a system having at least one processor, a plurality of sensor data associated with a plurality of mobile devices, wherein the plurality of sensor data corresponds to a plurality of content streams captured by the plurality of mobile devices, wherein each of the plurality of mobile devices comprises at least one recorder configured to capture a corresponding content stream, wherein a sensor data associated with a mobile device comprises a location data and an orientation data of the mobile device during capturing of a content stream; analyzing, by the system, the plurality of sensor data; and determining, by the system, a ROI based on at least the plurality of sensor data, thereby generating an estimation of the ROI.

Aspect 2: The method of aspect 1, further comprising receiving, by the system, a plurality of optical characteristics corresponding to the plurality of mobile devices; and wherein determining the ROI is based at least on the plurality of optical characteristics.

Aspect 3: The method of aspect 2, wherein an optical characteristic of a mobile device comprises a Field of View (FOV) of a lens comprised in the mobile device.

Aspect 4: The method of aspect 2, further comprising receiving a plurality of device identifiers from the plurality of mobile devices, wherein the plurality of optical characteristics is identified based on at least the plurality of device identifiers.

Aspect 5: The method of aspect 1, wherein analyzing the plurality of sensor data comprises: determining a plurality of origin points based at least on a plurality of location data corresponding to the plurality of mobile devices; and determining a plurality of vectors associated with the plurality of origin points based at least on a plurality of orientation data corresponding to the plurality of mobile devices, a vector associated with an origin point originating at the origin point.

Aspect 6: The method of aspect 5, wherein determining the ROI is based at least on the plurality of origin points and the plurality of vectors.

Aspect 7: The method of aspect 6, wherein the plurality of origin points is configured to be used as coordinates in a mapping coordinate system.

Aspect 8: The method of aspect 7, further comprising determining a plurality of vector intersections of the plurality of vectors.

Aspect 9: The method of aspect 8, wherein determining the ROI is based at least on the plurality of vector intersections.

Aspect 10: The method of aspect 1, further comprising: receiving a plurality of Field of Views (FOVs) associated with the plurality of mobile devices, a Field of View (FOV) associated with a mobile device being associated with a lens comprised in the mobile device; determining a plurality of origin points based at least on a plurality of location data corresponding to the plurality of mobile devices, the plurality of origin points configured as coordinates in a mapping coordinate system; determining a plurality of vectors associated with the plurality of origin points based at least on a plurality of orientation data corresponding to the plurality of mobile devices, a vector associated with an origin point originating at the origin point; generating a plurality of viewing frustums based at least on the plurality of FOVs, wherein an apex of a viewing frustum associated with a mobile device is coincident with the origin point associated with the mobile device, wherein a view direction of the viewing frustum is aligned with the vector associated with the mobile device; and determining a plurality of intersections of the plurality of viewing frustums, wherein determining the ROI is based at least on the plurality of intersections of the plurality of viewing frustums.

Aspect 11: The method of aspect 10, wherein determining a plurality of origin points comprises converting a plurality of location data corresponding to the plurality of mobile devices into a plurality of origin points in a mapping coordinate system; and wherein determining a plurality of vectors comprises converting a plurality of orientation data corresponding to the plurality of mobile devices into a plurality of vectors associated with the plurality of origin points, wherein a vector associated with an origin point originates at the origin point.

Aspect 12: The method of aspect 1, further comprising: receiving the plurality of content streams from the mobile devices; analyzing the plurality of content streams; determining at least one object associated with the ROI; and determining at least one spatial dimension associated with the at least one object; wherein determining the ROI is based at least on the at least one spatial dimension.

Aspect 13: The method of aspect 1 further comprising: receiving the plurality of content streams from the mobile devices; analyzing the plurality of content streams; determining at least one object associated with the ROI based at least on the plurality of content streams; determining at least one spatial dimension associated with the at least one object based at least on a predetermined association between a plurality of objects and a plurality of spatial dimensions; and determining a plurality of distances corresponding to the plurality of mobile devices and the ROI, wherein a distance between a mobile device and the ROI is estimated based on a spatial dimension of the at least one object determined in a content stream captured by the mobile device; wherein determining the ROI is based at least on the plurality of distances.

Aspect 14: The method of aspect 13, wherein determining the plurality of distances comprises determining a plurality of distances corresponding to the plurality of mobile devices, wherein a distance between a mobile device and the ROI is determined based at least on a spatial dimension of the at least one object determined in a content stream captured by the mobile device.

Aspect 15: The method of aspect 1, wherein the sensor data further comprises a distance data representing a distance of the mobile device from at least one object comprised in the ROI, wherein the mobile device comprises a ranging sensor configured to determine the distance.

Aspect 16: The method of aspect 15, wherein the ranging sensor comprises at least one of a LIDAR sensor and an image sensor.

Aspect 17: The method of aspect 1, further comprising: executing a search on a venue database based on the location data; determining the venue from a venue database based at least on the location data; and retrieving at least one spatial characteristic of the venue; wherein determining the ROI is based at least on the at least one spatial characteristic.

Aspect 18: The method of aspect 1, wherein the plurality of mobile devices comprises a drone configured for flight.

Aspect 19: The method of aspect 15, further comprising determining at least one trajectory associated with at least one mobile device based at least on analysis of the plurality of sensor data; wherein determining the ROI is based at least on the at least one trajectory.

Aspect 20: The method of aspect 1, further comprising: generating a visualization of the ROI and the plurality of mobile devices; and transmitting the visualization to at least one mobile device of the plurality of mobile devices.

Aspect 21: The method of aspect 20, further comprising: receiving a selection associated with the visualization; identifying one or more mobile devices associated with the selection; and transmitting one or more content streams captured by the one or more mobile devices.

Aspect 22: The method of any preceding aspect, wherein the sensor data comprises information indicative of a plurality of viewpoints respective to the ROI, the plurality of viewpoints respective to the ROI is respectively associated with the plurality of content streams.

Aspect 23: The method of any preceding aspect, wherein the device identifier comprises at least one of a device serial number, device identification information, device manufacturer, device type, device model, device component information and a version of software associated with the device.

Aspect 24: The method of any preceding aspect, wherein an attribute associated with the ROI comprises a shape, a size, a spatial dimension, a position, an orientation, and a volume.

Aspect 25: The method of any preceding aspect, wherein determining the ROI comprises determining at least one spatial dimension of the ROI.

Aspect 26: The method of any preceding aspect, wherein the at least one depth is estimated based at least on the origin point closest to the ROI.

Aspect 27: The method of any preceding aspect, further comprising determining a center point of the ROI based at least on the plurality of origin points.

Aspect 28: The method of any preceding aspect, wherein sensor data comprises imagery information.

Aspect 29: The method of any preceding aspect, wherein the plurality of distances is computed based on the center point, wherein a distance of the plurality of distances corresponding to an origin point is between the center point and the origin point.

Aspect 30: The method of any preceding aspect further comprising sampling a plurality of directions associated with the ROI.

Aspect 31: The method of any preceding aspect, wherein a shape of the ROI is estimated based on closest origin point from the center point in each direction of the plurality of directions.

Aspect 32: The method of any preceding aspect, wherein the at least one object is characterized by at least one of a size, a shape, a volume, a position, an orientation and a spatial dimension.

Aspect 33: The method of any preceding aspect, wherein determining the ROI comprises calculating at least one of a two-dimensional volume and a three-dimensional volume.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method of estimating a Region of Interest (ROI) corresponding to a plurality of content streams, the method comprising:
   receiving, by a system having at least one processor, a plurality of sensor data associated with a plurality of mobile devices, wherein the plurality of sensor data corresponds to the plurality of content streams captured by the plurality of mobile devices, wherein each of the plurality of mobile devices comprises at least one recorder configured to capture a corresponding content stream, wherein a sensor data associated with a mobile device comprises a location data and an orientation data of the mobile device during capturing of a content stream;
   analyzing, by the system, the plurality of sensor data, wherein analyzing the plurality of sensor data comprises:
      determining a plurality of origin points based at least on a plurality of location data corresponding to the plurality of mobile devices, the plurality of origin points configured as coordinates in a mapping coordinate system,
      determining a plurality of vectors associated with the plurality of origin points based at least on a plurality of orientation data corresponding to the plurality of mobile devices, a vector associated with an origin point originating at the origin point, wherein determining the plurality of vectors comprises converting the plurality of orientation data corresponding to the plurality of mobile devices into the plurality of vectors associated with the plurality of origin points;
      generating a plurality of viewing frustums associated with the plurality of mobile devices, and
      determining a plurality of intersections of the plurality of viewing frustums; and
   determining, by the system, a ROI based at least the plurality of intersections of the plurality of viewing frustums determined by the plurality of sensor data, thereby generating an estimation of the ROI.

2. The method of claim 1, further comprising receiving, by the system, a plurality of optical characteristics corresponding to the plurality of mobile devices; and wherein determining the ROI is based at least on the plurality of optical characteristics.

3. The method of claim 2, wherein an optical characteristic of a mobile device comprises a Field of View (FOV) of a lens comprised in the mobile device.

4. The method of claim 2, further comprising receiving a plurality of device identifiers from the plurality of mobile devices, wherein the plurality of optical characteristics is identified based on at least the plurality of device identifiers.

5. The method of claim 1, wherein analyzing the plurality of sensor data comprises:
   determining the plurality of origin points based at least on the plurality of location data corresponding to the plurality of mobile devices; and
   determining the plurality of vectors associated with the plurality of origin points based at least on the plurality of orientation data corresponding to the plurality of mobile devices, a vector associated with an origin point originating at the origin point.

6. The method of claim 5, wherein determining the ROI is based at least on the plurality of origin points and the plurality of vectors.

7. The method of claim 6, wherein the plurality of origin points is configured to be used as coordinates in the mapping coordinate system.

8. The method of claim 7, further comprising determining a plurality of vector intersections of the plurality of vectors; and wherein determining the ROI is based at least on the plurality of vector intersections.

9. The method of claim 1, further comprising:
   receiving a plurality of Field of Views (FOVs) associated with the plurality of mobile devices, a Field of View (FOV) associated with a mobile device being associated with a lens comprised in the mobile device;
   wherein generating the plurality of viewing frustums comprises generating the plurality of viewing frustums based at least on the plurality of FOVs, wherein an apex of a viewing frustum associated with a mobile device is coincident with the origin point associated with the mobile device, wherein a view direction of the viewing frustum is aligned with the vector associated with the mobile device.

10. The method of claim 9, wherein determining the plurality of origin points comprises converting the plurality of location data corresponding to the plurality of mobile devices into the plurality of origin points in the mapping coordinate system; and wherein a vector associated with an origin point originates at the origin point.

11. The method of claim 1, further comprising:
   receiving the plurality of content streams from the plurality of mobile devices;
   analyzing the plurality of content streams;
   determining at least one object associated with the ROI; and
   determining at least one spatial dimension associated with the at least one object;
   wherein determining the ROI is based at least on the at least one spatial dimension.

12. The method of claim 1, further comprising:
   receiving the plurality of content streams from the plurality of mobile devices;
   analyzing the plurality of content streams;
   determining at least one object associated with the ROI based at least on the plurality of content streams;
   determining at least one spatial dimension associated with the at least one object based at least on a predetermined association between a plurality of objects and a plurality of spatial dimensions; and determining a plurality of distances corresponding to the plurality of mobile devices and the ROI, wherein a distance between a mobile device and the ROI is estimated based on a spatial dimension of the at least one object determined in the content stream captured by the mobile device;

wherein determining the ROI is based at least on the plurality of distances.

13. The method of claim 12, wherein determining the plurality of distances comprises determining a plurality of distances corresponding to the plurality of mobile devices, wherein a distance between a mobile device and the ROI is determined based at least on the spatial dimension of the at least one object determined in the content stream captured by the mobile device.

14. The method of claim 1, wherein the sensor data further comprises a distance data representing a distance of the mobile device from at least one object comprised in the ROI, wherein the mobile device comprises a ranging sensor configured to determine the distance.

15. The method of claim 14, wherein the ranging sensor comprises at least one of a LIDAR sensor and an image sensor.

16. The method of claim 1, further comprising:
executing a search on a venue database based on the location data;
determining a venue from the venue database based at least on the location data; and
retrieving at least one spatial characteristic of the venue;
wherein determining the ROI is based at least on the at least one spatial characteristic.

17. The method of claim 1, wherein the plurality of mobile devices comprises a drone configured for flight.

18. The method of claim 16, further comprising determining at least one trajectory associated with at least one mobile device based at least on analysis of the plurality of sensor data; wherein determining the ROI is based at least on the at least one trajectory.

19. The method of claim 1, further comprising:
generating a visualization of the ROI and the plurality of mobile devices; and
transmitting the visualization to at least one mobile device of the plurality of mobile devices.

20. The method of claim 19, further comprising:
receiving a selection associated with the visualization;
identifying one or more mobile devices associated with the selection; and
transmitting one or more content streams captured by the plurality of mobile devices.

* * * * *